United States Patent
Hirakami et al.

(10) Patent No.: US 10,072,317 B2
(45) Date of Patent: Sep. 11, 2018

(54) FILAMENT

(71) Applicant: NIPPON STEEL & SUMITOMO METAL CORPORATION, Tokyo (JP)

(72) Inventors: Daisuke Hirakami, Kisarazu (JP); Makoto Okonogi, Chiba (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 218 days.

(21) Appl. No.: 15/116,482

(22) PCT Filed: Feb. 6, 2015

(86) PCT No.: PCT/JP2015/053367
§ 371 (c)(1),
(2) Date: Aug. 3, 2016

(87) PCT Pub. No.: WO2015/119241
PCT Pub. Date: Aug. 13, 2015

(65) Prior Publication Data
US 2017/0009317 A1    Jan. 12, 2017

(30) Foreign Application Priority Data
Feb. 6, 2014 (JP) .................. 2014-021685

(51) Int. Cl.
*C22C 38/00* (2006.01)
*C22C 38/32* (2006.01)
(Continued)

(52) U.S. Cl.
CPC ............... *C21D 9/525* (2013.01); *B60C 9/00* (2013.01); *B60C 9/0007* (2013.01); *C21D 8/06* (2013.01);
(Continued)

(58) Field of Classification Search
CPC ............ C21D 2211/009; C22C 38/001; C22C 38/002; C22C 38/005; C22C 38/02;
(Continued)

(56) References Cited

U.S. PATENT DOCUMENTS

| 5,208,434 A | 5/1993 | Minamida et al. |
| 5,248,353 A | 9/1993 | Nishida et al. |

(Continued)

FOREIGN PATENT DOCUMENTS

| CN | 1272890 A | 11/2000 |
| CN | 1745187 A | 3/2006 |

(Continued)

OTHER PUBLICATIONS

International Search Report for PCT/JP2015/053367 dated Apr. 7, 2015.

(Continued)

*Primary Examiner* — Carol M Koslow
(74) *Attorney, Agent, or Firm* — Birch, Stewart, Kolasch & Birch, LLP

(57) ABSTRACT

A filament according to an aspect of the present invention includes a predetermined chemical composition, in which a diameter r of the filament is 0.15 mm to 0.35 mm, a soft portion is formed along an outer circumference of the filament, the Vickers hardness of the soft portion is lower than that of a position of the filament at a depth of ¼ of the diameter r by Hv 50 or higher, the thickness of the soft portion is 1 μm to 0.1×r mm, the metallographic structure of a center portion of the filament contains 95% to 100% of pearlite by area %, the average lamellar spacing of pearlite in a portion from a surface of the filament to a depth of 1 μm is less than that of pearlite at the center of the filament, the difference between the average lamellar spacing of pearlite in the portion from the surface of the filament to the depth (Continued)

of 1 μm and the average lamellar spacing of pearlite at the center of the filament is 2.0 nm or less, and the tensile strength is 3200 MPa or higher.

8 Claims, 8 Drawing Sheets

(51) Int. Cl.
| | |
|---|---|
| *B60C 9/00* | (2006.01) |
| *C21D 8/06* | (2006.01) |
| *C21D 9/52* | (2006.01) |
| *C21D 9/573* | (2006.01) |
| *C22C 38/02* | (2006.01) |
| *C22C 38/04* | (2006.01) |
| *C22C 38/06* | (2006.01) |
| *C22C 38/10* | (2006.01) |
| *C22C 38/12* | (2006.01) |
| *C22C 38/14* | (2006.01) |
| *C22C 38/16* | (2006.01) |
| *C22C 38/18* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/30* | (2006.01) |
| *C21D 9/64* | (2006.01) |
| *B65G 15/36* | (2006.01) |

(52) U.S. Cl.
CPC ............ *C21D 8/065* (2013.01); *C21D 9/5732* (2013.01); *C21D 9/64* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/10* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *B65G 15/36* (2013.01); *C21D 2201/03* (2013.01); *C21D 2211/009* (2013.01)

(58) Field of Classification Search
CPC ......... C22C 38/04; C22C 38/06; C22C 38/10; C22C 38/12; C22C 38/14; C22C 38/16; C22C 38/18–38/32
See application file for complete search history.

(56) References Cited

U.S. PATENT DOCUMENTS

| | | | |
|---|---|---|---|
| 2010/0126643 A1 | 5/2010 | Yamasaki et al. | |
| 2011/0168302 A1 | 7/2011 | Takahashi et al. | |
| 2012/0318410 A1* | 12/2012 | Tarui | B23D 61/185 148/506 |
| 2013/0263975 A1 | 10/2013 | Yamasaki et al. | |

FOREIGN PATENT DOCUMENTS

| | | |
|---|---|---|
| CN | 101765672 A | 6/2010 |
| CN | 102292460 A | 12/2011 |
| EP | 0 218 167 A1 | 4/1987 |
| EP | 1528115 A1 | 5/2005 |
| EP | 2175043 A1 | 4/2010 |
| JP | 62-77418 A | 4/1987 |
| JP | 4-280915 A | 10/1992 |
| JP | 8-53737 A | 2/1996 |
| JP | 10-287955 A | 10/1998 |
| JP | 3001572 B1 | 1/2000 |
| JP | 2000-256792 A | 9/2000 |
| JP | 2001-181790 A | 7/2001 |
| JP | 2003-171737 A | 6/2003 |
| JP | 2005-36356 A | 2/2005 |
| JP | 2005-54260 A | 3/2005 |
| JP | 2010-270391 A | 12/2010 |
| JP | 2011-219829 A | 11/2011 |
| JP | 5114684 B2 | 1/2013 |
| JP | 5315790 B2 | 10/2013 |
| WO | WO 2011/089782 A1 | 7/2011 |

OTHER PUBLICATIONS

Written Opinion of the International Searching Authority for PCT/JP2015/053367 (PCT/ISA/237) dated Apr. 7, 2015.
Korean Office Action, dated Aug. 17, 2017, for corresponding Korean Application No. 10-2016-7021062, with a partial English translation.
Chinese Office Action and Search Report issued in Chinese Application No. 201580007167.3, dated May 3, 2017, together with an English translation.
Japanese Office Action, dated Jul. 18, 2017 for corresponding Japanese Application No. 2015-561053, with English translation.
Japanese Office Action, dated Jul. 18, 2017 for related Japanese Application No. 2015-561057, with English translation.
Extended European Search Report, dated Jun. 23, 2017, for counterpart European Application No. 15746084.1.
Chinese Office Action and Search Report issued in Chinese Application No. 201580007165.4, dated May 10, 2017, with English translation.
English translation of Written Opinion issued in PCT/JP2015/053387, dated Apr. 7, 2015 (Form PCT/ISA/237).
International Search Report issued in PCT/JP2015/053387, dated Apr. 7, 2015 (Form PCT/ISA/210).
U.S. Non-Final Office Action dated May 17, 2017 in U.S. Appl. No. 15/115,952.

* cited by examiner

FILAMENT

TECHNICAL FIELD OF THE INVENTION

The present invention relates to a filament as a material of a high-strength steel cord which is used as a reinforcing material of a rubber product such as an automobile tire, a high-pressure rubber hose, or a conveyor belt.

Priority is claimed on Japanese Patent Application No. 2014-021685, filed on Feb. 6, 2014, the content of which is incorporated herein by reference.

RELATED ART

For example, in a rubber product such as an automobile tire, a chemical fiber such as rayon, nylon, or polyester, or a steel cord formed of a steel is used as a reinforcing material. These reinforcing materials play a role as a framework of an automobile tire, which have a large effect on the fuel consumption, high-speed durability, and driving stability of a vehicle on which the automobile tire is mounted. Recently, from the viewpoint of improving these characteristics, the use frequency of a steel cord as a reinforcing material has increased.

Here, for example, as disclosed in Patent Documents 1 and 2, a steel cord having a stranded wire structure in which a plurality of steel wires (filaments) are stranded has been widely proposed. Such a steel cord is manufactured through the following steps. First, dry drawing is performed on a wire rod having a diameter of 5 mm to 6 mm to obtain a steel wire having a diameter of about 1.0 mm to 4.0 mm. A heat treatment called a patenting treatment is performed on this steel wire to soften the steel wire. A brass plating is formed on a surface of the softened steel wire, and wet drawing (finish drawing) is performed on the steel wire. As a result, a filament having a diameter of about 0.15 mm to 0.35 mm is obtained. By stranding filaments obtained as described above, a steel cord having a stranded wire structure is manufactured. The brass plating is formed to improve adhesion between rubber and the steel cord.

PRIOR ART DOCUMENT

Patent Document

[Patent Document 1] Japanese Unexamined Patent Application, First Publication No. 2005-054260

[Patent Document 2] Japanese Unexamined Patent Application, First Publication No. 2005-036356

DISCLOSURE OF THE INVENTION

Problems to be Solved by the Invention

As described above, during the manufacturing of a steel cord, stranding is performed on a filament having a diameter of about 0.15 mm to 0.35 mm. Therefore, good workability is required for a filament for a steel cord. On the other hand, recently, from the viewpoint of reducing the environmental burden, the weight of an automobile tire has been reduced in order to reduce the fuel consumption of an automobile. Accordingly, high-strengthening is required for a steel cord.

However, in a case where the strength of a filament is improved in order to form a high-strength steel cord, the ductility of the filament is insufficient, and the workability of the filament deteriorates. Therefore, the filament on which high-strengthening is performed has a problem in that defects such as cracking may occur during stranding. In addition, in a case where the strength of a filament is high, stranding cannot be performed favorably, and stranding defects may occur. As described above, in the related art, a filament for a steel cord having both high strength and good workability cannot be obtained, and a high-strength steel cord cannot be stably manufactured.

The present invention has been made in consideration of the above-described circumstances, and an object thereof is to provide a high-strength filament with which a steel cord having high strength and good workability can be stably manufactured.

Means for Solving the Problem

The summary of the present invention for solving the above-described problems is as follows.

(1) According to an aspect of the present invention, there is provided a filament including, as a chemical composition, by mass %, C: 0.70% to 1.20%, Si: 0.15% to 0.60%, Mn: 0.10% to 1.00%, N: 0.0010% to 0.0050%, Al: 0% to 0.010%, Ti: 0% to 0.10%, Cr: 0% to 0.50%, Co: 0% to 0.50%, V: 0% to 0.50%, Cu: 0% to 0.20%, Nb: 0% to 0.100%, Mo: 0% to 0.20%, W: 0% to 0.200%, B: 0% to 0.0030%, REM: 0% to 0.0050%, Ca: 0% to 0.0050%, Mg: 0% to 0.0050%, Zr: 0% to 0.0100%, and a remainder including Fe and impurities, in which a diameter r of the filament is 0.15 mm to 0.35 mm, a soft portion is formed along an outer circumference of the filament, the Vickers hardness of the soft portion is lower than that of a position of the filament at a depth of ¼ of the diameter r by Hv 50 or higher, the thickness of the soft portion is 1 μm to 0.1×r mm, the metallographic structure of the filament other than the soft portion contains 95% to 100% of pearlite by area %, the average lamellar spacing of the pearlite in a portion from a surface of the filament to a depth of 1 μm is less than that of the pearlite at the center of the filament, a difference between the average lamellar spacing of the pearlite in the portion from the surface of the filament to the depth of 1 μm and the average lamellar spacing of the pearlite at the center of the filament is 2.0 nm or less, and a tensile strength is 3200 MPa or higher.

(2) In the filament according to (1), the thickness of the soft portion may be 2 μm to 0.08×r mm.

(3) In the filament according to (1) or (2), the difference between the average lamellar spacing in the region from the surface of the filament to the depth of 1 μm and the average lamellar spacing of the center of the filament may be 1.7 nm or less.

(4) The filament according to any one of (1) to (3) may further include, as the chemical composition, by mass %, one element or two or more elements selected from the group consisting of Ti: 0.005% to 0.10%, Cr: more than 0% to 0.50%, Co: more than 0% to 0.50%, V: more than 0% to 0.50%, Cu: more than 0% to 0.20%, Nb: more than 0% to 0.100%, Mo: more than 0% to 0.20%, W: more than 0% to 0.20%, B: more than 0% to 0.0030%, REM: more than 0% to 0.0050%, Ca: more than 0.0005% to 0.0050%, Mg: more than 0.0005% to 0.0050%, and Zr: more than 0.0005% to 0.0100%.

Effects of the Invention

The filament having the above-described configuration includes a soft portion, in which the soft portion has a smaller average lamellar spacing than the center portion of the filament, and a difference between the average lamellar spacing of the center portion of the filament and the average lamellar spacing of the region from the surface of the filament to a depth of 1 μm is 2.0 nm or less. In addition, the Vickers hardness of the soft portion of the filament having the above-described configuration is lower than that of the filament at a depth of ¼ of the diameter r by Hv 50 or higher. As the Vickers hardness decreases, the ductility increases. The present inventors found that, in the filament including the soft portion on the surface thereof, the tensile strength is improved due to the center portion having a high hardness, and the ductility is significantly improved due to the soft portion having a low hardness. Further, the present inventors found that, by allowing the average lamellar spacing of pearlite in the portion from the surface of the filament to a depth of 1 μm to be less than that of pearlite at the center of the filament, the thickness of cementite in the pearlite structure is reduced, and the cracking of cementite which causes wire breaking is small. In stranding, the soft portion of the filament is mainly deformed. Good workability is required for a filament for a steel cord. According to the above-described configuration, the occurrence of defects such as cracking in the filament can be suppressed in the stranding. The stranding can be performed favorably on the filament including the above-described feature. Therefore, due to the above-described configuration, a high-quality steel cord in which the occurrence of stranding defects is suppressed can be provided.

In addition, the filament having the above-described configuration includes, as a chemical composition, by mass %, C: 0.70% to 1.20%, Si: 0.15% to 0.60%, Mn: 0.10% to 1.00%, N: 0.0010% to 0.0050%, Al: 0% to 0.010%, Ti: 0% to 0.10%, Cr: 0% to 0.50%, Co: 0% to 0.50%, V: 0% to 0.50%, Cu: 0% to 0.20%, Nb: 0% to 0.100%, Mo: 0% to 0.20%, W: 0% to 0.200%, B: 0% to 0.0030%, REM: 0% to 0.0050%, Ca: 0% to 0.0050%, Mg: 0% to 0.0050%, Zr: 0% to 0.0100%, and a remainder including Fe and impurities, in which a metallographic structure of the center portion of the filament contains 95% to 100% of a pearlite structure by area %. The center portion of the filament having the above-described configuration has a sufficiently high tensile strength. Accordingly, when the filament having the above-described configuration is used, the weight of a steel cord can be reduced.

In addition, the thickness of the soft portion of the filament having the above-described configuration is 1 μm to 0.1×r mm. As described above, r refers to the diameter of the filament (diameter). Since the thickness of the soft portion is 1 μm or more, the filament having the above-described configuration has sufficiently good workability, and the occurrence of defects such as cracking can be suppressed in stranding. In addition, since the thickness of the soft portion is 0.1×r mm or less, the tensile strength of the filament having the above-described configuration is maintained to be high, and the strength of a steel cord obtained from the filament can be sufficiently secured. The thickness of the soft portion is the thickness of a region having a Vickers hardness which is lower than that of the filament at a depth of ¼ of the diameter r by Hv 50 or higher.

According to the present invention, it is possible to provide a filament having high strength and good workability, with which a high-strength steel cord can be stably manufactured.

EMBODIMENT OF THE INVENTION

Hereinafter, a filament according to an embodiment of the present invention will be described with reference to the accompanying drawings. A filament 10 according to the embodiment is used as a raw material during the manufacturing of a high-strength steel cord which is used as a reinforcing material of a rubber product such as an automobile tire.

The filament 10 according to the embodiment has a diameter r which satisfies 0.15 mm≤r≤0.35 mm, and includes as a chemical composition, by mass %, C: 0.70% to 1.20%, Si: 0.15% to 0.60%, Mn: 0.10% to 1.00%, N: 0.0010% to 0.0050%, Al: 0% to 0.010%, Ti: 0% to 0.10%, Cr: 0% to 0.50%, Co: 0% to 0.50%, V: 0% to 0.50%, Cu: 0% to 0.20%, Nb: 0% to 0.100%, Mo: 0% to 0.20%, W: 0% to 0.200%, B: 0% to 0.0030%, REM: 0% to 0.0050%, Ca: 0% to 0.0050%, Mg: 0% to 0.0050%, Zr: 0% to 0.0100%, and a remainder including Fe and impurities.

Figure 1:
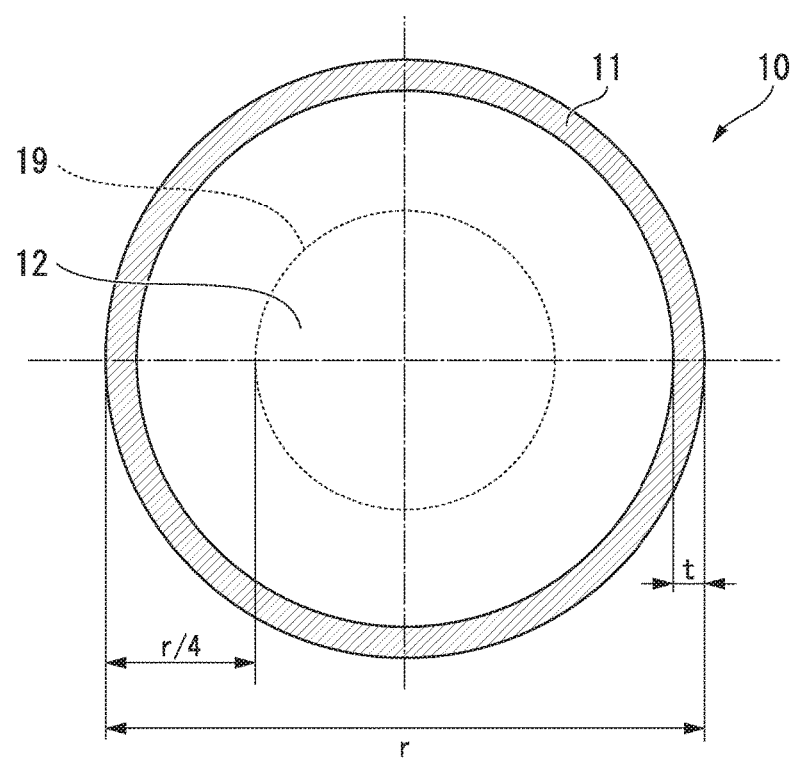
FIG. 1 is a C cross-sectional view of a filament according to the embodiment.

As shown in FIG. 1, the filament 10 according to the embodiment includes a soft portion 11 and a center portion 12. The soft portion 11 is formed along an outer circumference of the filament 10. The Vickers hardness of the soft portion 11 is lower than that of the filament 10 at a depth of ¼ of the diameter r by Hv 50 or higher. The thickness of the soft portion is 1 μm to 0.1×r mm. Further, the average lamellar spacing of pearlite in a region from a surface of the filament 10 to a depth of 1 μm is less than that of pearlite at the center of the filament 10. The difference between the average lamellar spacing of pearlite in the region from the surface of the filament 10 to a depth of 1 μm and the average lamellar spacing of pearlite at the center of the filament 10 is 2.0 nm or less. Further, the tensile strength of the filament 10 is 3200 MPa or higher.

(Hardness of Soft portion 11: Lower than Vickers Hardness of Filament at Depth of ¼ of Diameter r by Hv 50 or Higher)

As shown in FIG. 1, the filament 10 according to the embodiment includes the soft portion 11 that is formed along an outer circumference of the filament 10. In the filament 10 according to the embodiment, a region having a Vickers hardness, which is lower than that of the filament at a depth of ¼ of the diameter r by Hv 50 or higher, is defined as the soft portion 11. That is, the Vickers hardness of the soft portion 11 is lower than that of the filament at a depth of ¼ of the diameter r by Hv 50 or higher. In FIG. 1, a broken line indicated by reference numeral 19 represents the portion of the filament at a depth of ¼ of the diameter r. In addition, a portion of the filament 10 according to the embodiment other than the soft portion 11 is defined as the center portion 12. The difference between the hardness of the soft portion 11 and the hardness of the center portion 12 is derived from a difference in dislocation density and a difference in cementite morphology. A metallographic structure of the center portion 12 contains 95% to 100% of pearlite, and a metallographic structure of the soft portion 11 also contains the same amount of pearlite as above. However, the majority of dislocations which are introduced into the metallographic structure after pearlite transformation are removed in the soft portion 11. The soft portion 11 has a lower hardness than the center portion 12 and thus has a higher ductility than the center portion 12.

(Thickness of Soft portion 11: 1 μm to 0.1×r mm)

A thickness t of the soft portion 11 of the filament 10 according to the embodiment is within a range of 1 μm to 0.1×r mm. That is, in the filament 10 according to the embodiment, a region having a Vickers hardness, which is lower than that of a portion 16 at a depth of ¼ of the diameter r by Hv 50 or higher, is formed in a region from an outer circumferential surface of the filament 10 to the depth t. For example, in a case where the diameter r is 0.30 mm, the thickness t of the soft portion 11 is 1 μm to 0.030 mm (30 μm). The soft portion 11 having a higher ductility than the center portion 12 is formed along the outer circumference of the filament 10. Therefore, the filament 10 exhibits good workability during stranding during which significant deformation is applied mainly to the outer circumference. On the other hand, since the center portion 12 has a sufficiently high hardness, the filament 10 has a high tensile strength of 3200 MPa or higher. In a case where the thickness t of the soft portion 11 is 1 μm or less, working defects such as wire breaking are likely to occur during stranding, and the like. In addition, in a case where the thickness t of the soft portion 11 exceeds 0.1×r mm, the tensile strength decreases. Accordingly, the thickness t of the soft portion 11 is within a range of 1 μm to 0.1×r mm. A preferable range of the thickness t of the soft portion 11 is 2 μm to 0.08×r mm.

Figure 2:
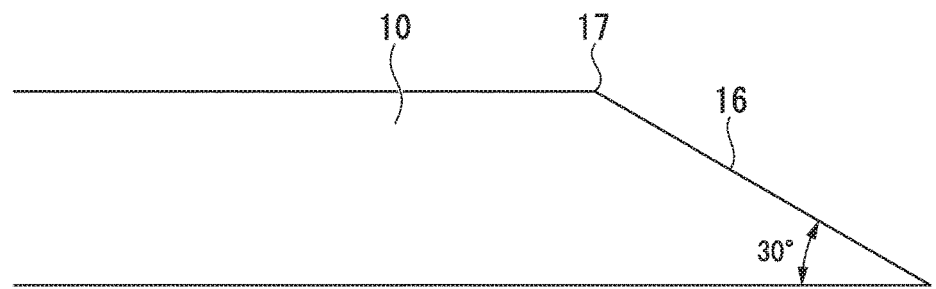
FIG. 2 is a side view of the filament in which an elliptic cross-section is formed in order to measure a thickness of a soft portion of the filament.
Figure 3:
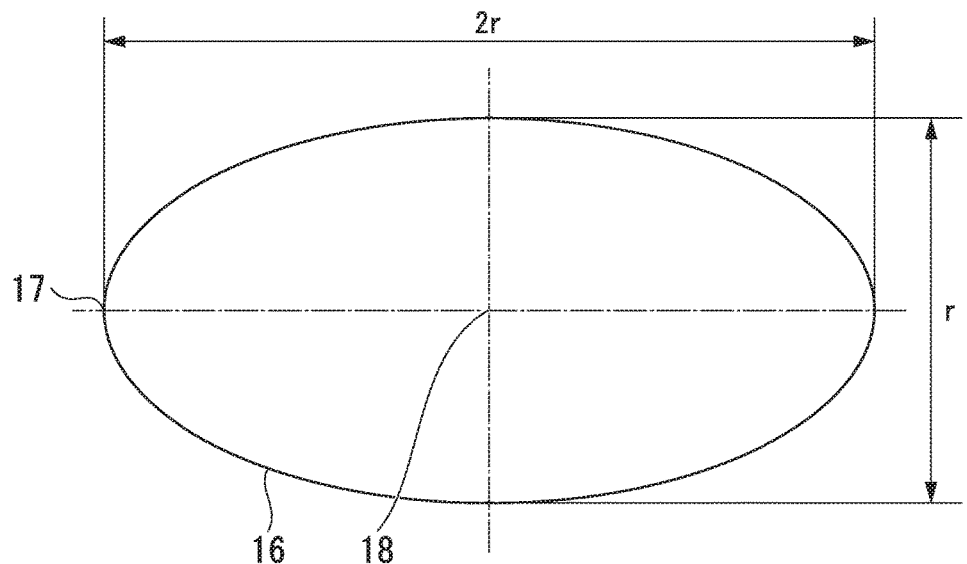
FIG. 3 is the elliptic cross-section for measuring the thickness of the soft portion of the filament.
Figure 4:
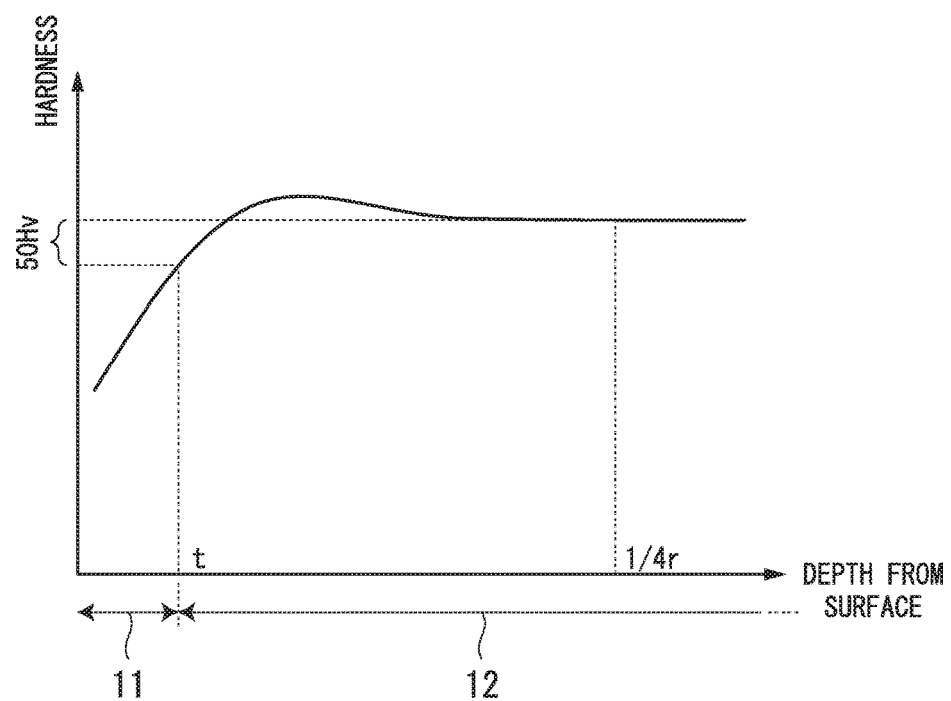
FIG. 4 is a graph schematically showing a hardness distribution of the filament according to the embodiment.

The thickness of the soft portion 11 of the filament 10 according to the embodiment can be determined from a hardness distribution of the filament 10 in a depth direction. Hereinafter, an example of a method for measuring the hardness distribution of the filament 10 in the depth direction will be described. An elliptic cross-section 16 having minor axis of which the length is r and major axis of which the length is 2r, which is obtained by cutting the filament 10 having diameter of r at an angle of 30° with respect to a drawing direction as shown in FIG. 2 and FIG. 3, is appropriately prepared, and the hardness is continuously measured between an end edge in a long axes direction 17 of the elliptic cross-section 16 and a center 18 of the elliptic cross-section 16. As a result, a relationship between distance from the end edge in the long axes direction 17 of the elliptic cross-section 16 and the hardness can be obtained. Distance between an arbitrary measuring point between the end edge in the long axes direction 17 of the elliptic cross-section 16 and the center 18 of the elliptic cross-section 16 and the end edge in the long axes direction 17 of the elliptic cross-section 16 is twice the depth of the arbitrary measuring point. A graph showing a relationship between a depth and a hardness of the filament 10 such as a graph shown in FIG. 4 can be obtained by converting the distance from the end edge in the long axes direction 17 of the elliptic cross-section 16 to the depth regarding the filament 10 based on the above-described relationship. From this graph, the thickness of the region having a Vickers hardness, which is lower than that of the filament 10 at a depth of ¼ of the diameter r by Hv 50 or higher, can be obtained.

Figure 5:
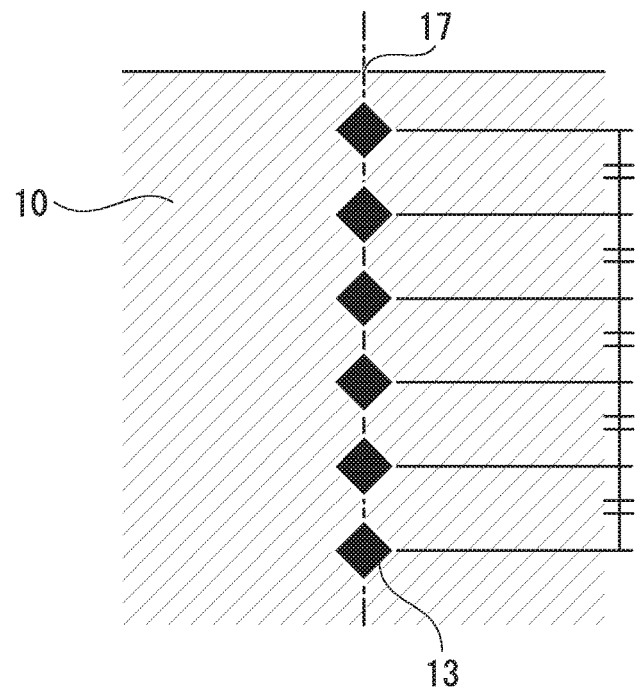
FIG. 5 is a diagram showing an example of a method of creating a hardness distribution graph of the filament according to the embodiment.
Figure 6:
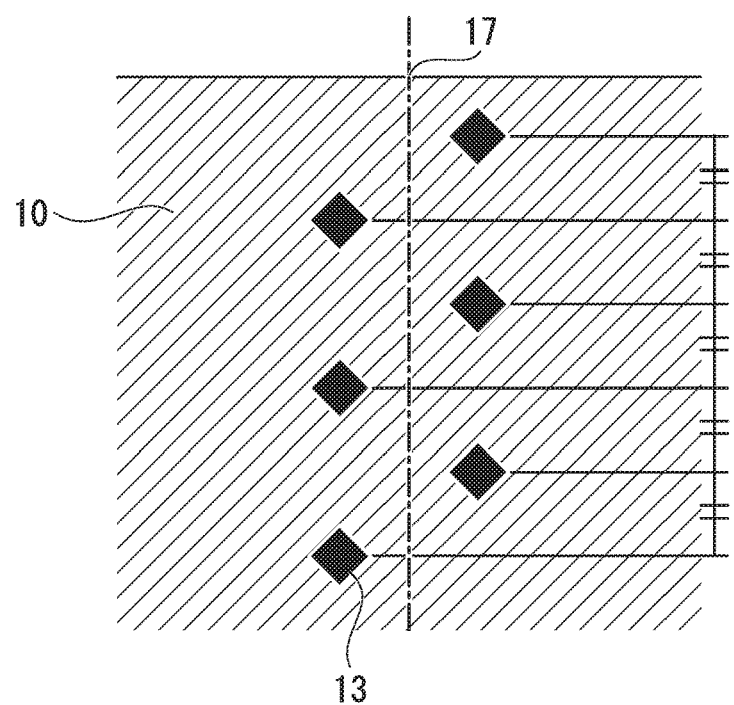
FIG. 6 is a diagram showing an example of a method of creating a hardness distribution graph of the filament according to the embodiment.
Figure 7:
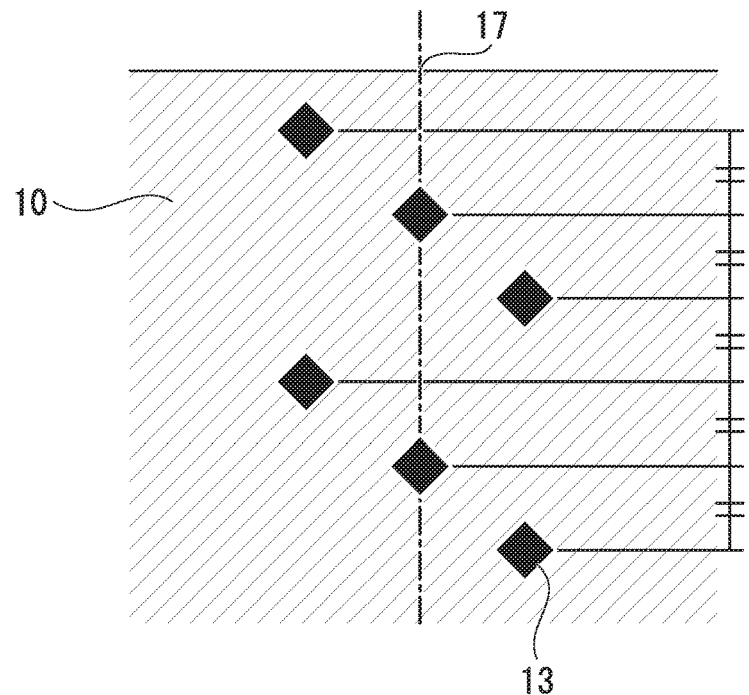
FIG. 7 is a diagram showing an example of a method of creating a hardness distribution graph of the filament according to the embodiment.

In order to improve the measurement accuracy of the thickness of the soft portion 11, it is preferable to increase the number of hardness measurement points. On the other, in a case where the Vickers hardness measurement is performed on one sample multiple times, it is necessary to separate the measurement points from each other at a distance which is about two times or more the length of a diagonal line of an indentation 13 which is formed at a measurement point. In the previous measurement, the indentation 13 is formed, which causes an increase in the hardness in the vicinity of the indentation 13. Therefore, in a case where the next measurement is performed on a region near the indentation 13 formed in the previous measurement, an accurate measurement value cannot be obtained. When the depth of the soft portion 11 of the filament 10 according to the embodiment is determined, in order to increase the number of measurement points, the hardness is measured in the elliptic cross-section 16 obtained by cutting the filament 10 at an angle of 30° with respect to the drawing direction. For example, hardnesses at an interval in depth of 1.0 μm can be obtained by measuring hardnesses between the end edge in the long axes direction 17 of the elliptic cross-section 16 and the center 18 of the elliptic cross-section 16 at an interval regarding distance between the measuring points of 2.0 μm. In addition, in order to increase the number of measurement points, the measurement points can be set as shown in FIG. 6 or FIG. 7. In a typical method for measuring the hardness distribution, when the hardness distribution in the depth direction is measured, the measurement is continuously performed along one straight line from the outer circumference of a cross section to the center of the cross section (refer to FIG. 5). The above-described measurement can improve the measurement efficiency. However, when the depth of the soft portion 11 of the filament 10 according to the embodiment is determined, it is preferable that the measurement is performed along a plurality of straight lines which are parallel to a straight line from the end edge in the long axes direction 17 of the elliptic cross-section 16 to the center of the elliptic cross-section 16 as shown in FIG. 6 or FIG. 7. As a result, the number of measurement points can be increased without narrowing the distance between the measurement points. In order to measure the depth of the soft portion 11 of the filament 10 according to the embodiment with sufficiently high accuracy, it is preferable that the depth interval in the hardness measurement is 1.0 μm or less. In addition, in order to achieve the above-described depth interval, it is preferable to appropriately adjust a method of setting a load or a measurement point, a method of obtaining a measurement surface, and the like in the Vickers hardness measurement. The angle between the elliptic cross-section 16 and the drawing direction of the filament is not limited to 30°. As long as the measurement is performed with sufficient accuracy, an adequate angle may be selected. However, if the hardness is measured in C-cross section (a cut surface perpendicular to the drawing direction) of the filament according to the embodiment, the measurement accuracy may become insufficient.

(Metallographic Structure of Center Portion of Filament: Containing 95 Area % to 100 Area % of Pearlite)

A metallographic structure of the center portion 12 of the filament 10 according to the embodiment (that is, the metallographic structure of the filament 10 other than the soft portion 11) contains 95% to 100% of pearlite by area ratio. It is necessary that the metallographic structure of the center portion 12 contains 95% or higher of pearlite in order to control the tensile strength of the filament 10 to be 3200 MPa or higher and to improve the workability of the filament 10. It is preferable that the amount of pearlite be large. Therefore, the upper limit value of the amount of pearlite in the center portion 12 of the filament 10 is 100%. Metallographic structures other than pearlite such as martensite, bainite, cementite, or degenerate pearlite may be contained as long as the amount of pearlite satisfies a predetermined value. Degenerate pearlite is a metallographic structure including granular cementite and granular ferrite. Degenerate pearlite is distinguished from typical pearlite (pearlite 20 shown in FIG. 9) having a configuration in which layered cementite and layered ferrite overlap each other. "Pearlite" according to the embodiment represents "typical pearlite". The amount of pearlite in the soft portion 11 of the filament is not necessarily specified, but is typically the same as the amount of pearlite in the center portion 12 of the filament.

A method of measuring the amount of pearlite in the center portion 12 of the filament 10 is not particularly limited. For example, the amount of pearlite may be obtained using a method including: polishing and etching the C cross-section of the filament 10 so as to make the pearlite structure of the C cross-section of the filament 10 appear; and taking optical microscope images or electron microscope images of the C cross-section so as to obtain the area of pearlite in the images. It is preferable that the amount of pearlite in the filament 10 is obtained, for example, using a method including: setting portions, where the optical microscope images or the electron microscope images are taken, at the center of the C cross-section of the filament 10 and at eight positions in the ¼ depth region of the C cross-section of the filament 10 which are arranged at an angle interval of 45° with respect to the center of the filament 10; obtaining the amounts of pearlite at these image-taking positions; and obtaining the average value of the amounts of pearlite at the positions.

(Average Lamellar Spacing of Pearlite in Region from Surface of Filament to Depth of 1 μm: Less than that of Pearlite at Center of Filament, and Difference Between Average Lamellar Spacings is 2.0 nm or Less)

The average lamellar spacing of pearlite in a region from a surface of the filament 10 according to the embodiment to a depth of 1 μm is less than that of pearlite at the center of the filament 10. The difference between the average lamellar spacing of pearlite in the region from the surface of the filament 10 to a depth of 1 μm and the average lamellar spacing of pearlite at the center of the filament 10 (hereinafter, abbreviated as "difference in average lamellar spacing") is more than 0 nm and 2.0 nm or less. The region from the surface of the filament 10 to a depth of 1 μm is contained in the soft portion 11. Accordingly, in the filament 10 according to the embodiment, the average lamellar spacing of the soft portion 11 is less than that of the center.

As the average lamellar spacing decreases, cementite in pearlite is refined, which increases ductility. On the other hand, dislocations are introduced into the filament 10 through a heat treatment for reducing the average lamellar spacing, and these dislocations reduce the ductility of the filament 10. In general, in a case where the average lamellar spacing of pearlite in the filament 10 is small, an effect of the dislocation introduction exceeds an effect of the cementite refinement. Therefore, the ductility of the filament 10 is reduced. However, in the soft portion 11 of the filament 10 according to the embodiment, most of the dislocations are removed by surface layer heating described below. Accordingly, in a case where the average lamellar spacing of pearlite in the filament 10 according to the embodiment is reduced, since the effect of the dislocation introduction is suppressed, the effect of improving the ductility due to the cementite refinement can be obtained.

In a case where the difference in average lamellar spacing is excessively large, the deformation of the filament 10 is inhomogeneous, and delamination is likely to occur. The present inventors found that, in a case where the difference in average lamellar spacing of the filament 10 is more than 2.0 nm, delamination is likely to occur with high frequency. Accordingly, in the filament 10 according to the embodiment, it is necessary that the difference in average lamellar spacing is 2.0 nm or less. The upper limit value of the difference in average lamellar spacing is preferably 1.8 nm, 1.7 nm, 1.6 nm, or 1.5 nm.

Figure 8:
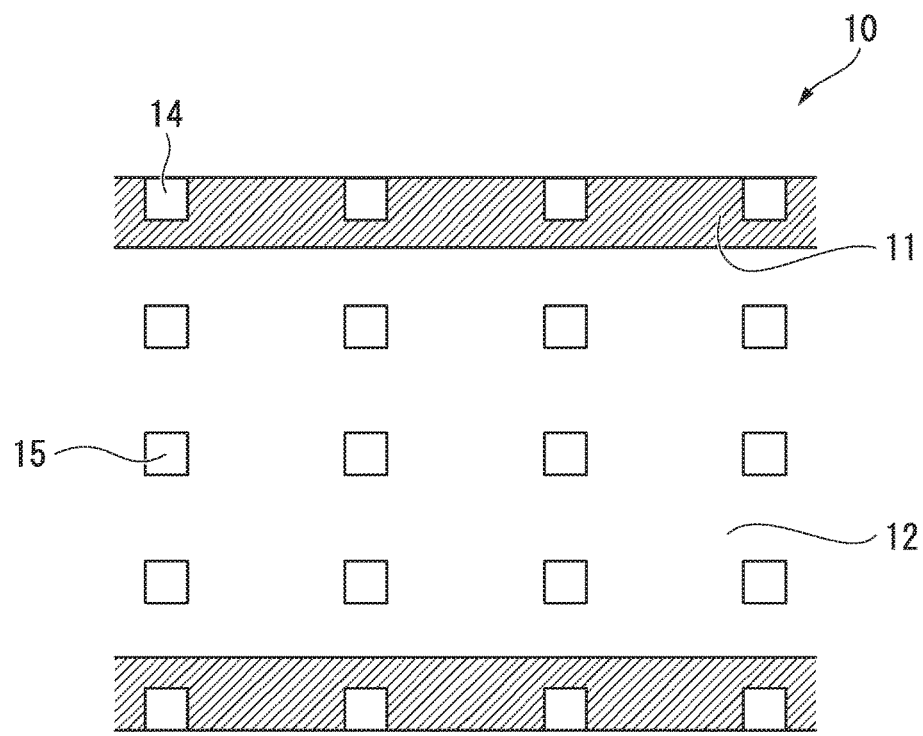
FIG. 8 is a diagram showing an example of a method for measuring a difference in average lamellar spacing of the filament according to the embodiment.
Figure 9:
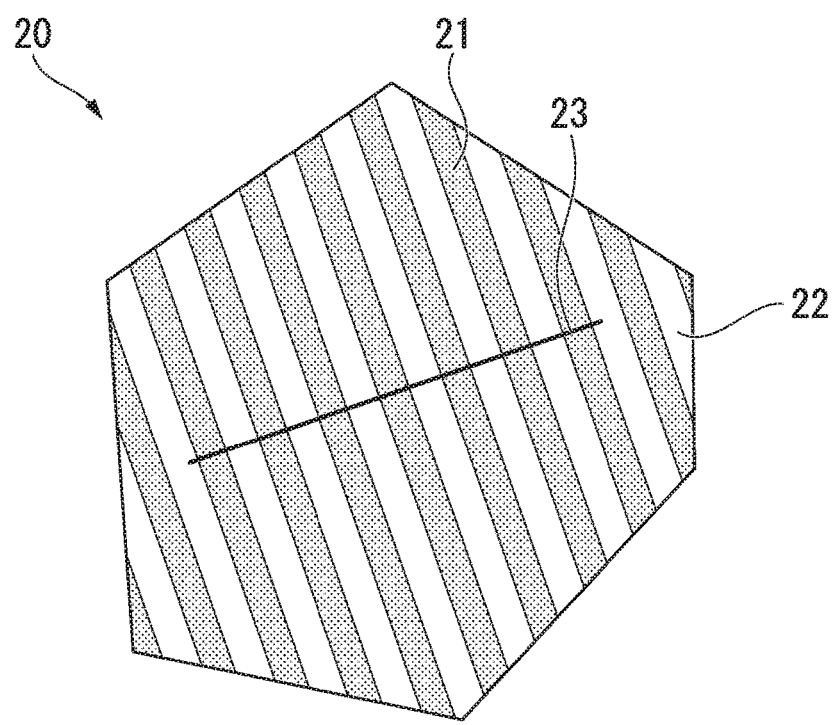
FIG. 9 is a diagram showing an example of a method for measuring an average lamellar spacing of the filament according to the embodiment.

The average lamellar spacing of pearlite in the region from the surface of the filament 10 to a depth of 1 μm may be obtained through steps described below. First, a cross-section (L cross-section) of the filament 10, which is parallel to the drawing direction and passes through a center axis of the filament 10, is created. Then, a thin film sample (L cross-section thin film sample) having a thickness of 100 μm is created from the L cross-section. And then, a sample of 50 μm×30 μm×1 μm is cut out from the surface layer part of the L cross-section thin film sample with FIB (Focused Ion Beam) apparatus. The cut-out sample is electrolytically bonded on a sample holder for transmission electron microscope, and an electron microscope image including the region from the surface of the filament to a depth of 1 μm is taken. A surface layer average lamellar spacing measurement region 14 shown in FIG. 8 is cut from the image. The surface layer average lamellar spacing measurement region 14 is a square having a size of 1 μm×1 μm, and one side of the square matches with the surface of the filament 10. The visual field may be set as the surface layer average lamellar spacing measurement region 14 by setting the visual field of the electron microscope image as a square having a size of 1 μm×1 μm and making one side of the visual field to match with the surface of the filament 10. Next, as shown in FIG. 9, a pearlite having the smallest lamellar spacing (pearlite 20 in FIG. 9) is selected from a plurality of pearlites contained in the surface layer average lamellar spacing measurement region 14. A line segment 23 having a length of 0.2 μm which is perpendicular to ferrite layers 21 and cementite layers 22 contained in the pearlite 20 is drawn, the number of cementite layers 22 intersecting the line segment 23 is counted, and the length (0.2 μm) of the line segment is divided by the number of cementite layers 22. As a result, a lamellar spacing of the surface layer average lamellar spacing measurement region 14 is obtained. Lamellar spacings of eight surface layer average lamellar spacing measurement regions 14 are obtained by repeating the above-described operation 8 times, and the average thereof is obtained. As a result, the average lamellar spacing of pearlite in the region from the surface of the filament 10 to a depth of 1 μm is obtained.

The average lamellar spacing of the center of the filament may be obtained through steps described below. Using the same method as the above-described method of measuring the average lamellar spacing of the surface layer part of the filament, a L cross-section of the filament 10 is prepared, and an electron microscope image of a region including the center axis of the filament 10 and an electron microscope image including the portion of the filament at a depth of ¼ of the diameter r are taken. Next, lamellar spacings of twelve center average lamellar spacing measurement regions 15, which are squares having a size of 1 μm×1 μm, are obtained. In four regions of the twelve center average lamellar spacing measurement regions 15, one of line segments connecting the middle points of sides opposite to each other matches with the center axis of the filament 10. In eight regions of the twelve center average lamellar spacing measurement regions 15, one of line segments connecting the middle points of sides opposite to each other matches with the region from the surface of the filament 10 to a depth of ¼ of the diameter r. Lamellar spacings relating to the twelve center average lamellar spacing measurement regions 15 are obtained, and the average thereof is obtained. The obtained average value can be considered as the average lamellar spacing of the center of the filament 10.

The lamellar spacing in the embodiment refers to the average value of the distances between the center lines of adjacent cementite layers 22 with a ferrite layer 21 interposed therebetween.

Next, the reason for limiting the chemical composition of the filament 10 according to the embodiment as described above will be described.

(C: 0.70% to 1.20%)

C is an element for improving the strength of the filament 10. In order to obtain a pearlite structure as an eutectoid structure, the C content is preferably about 0.80%. In a case where the C content is less than 0.70%, the filament 10 becomes hypo-eutectoid steel in which a large amount of a non-pearlite structure is present. On the other hand, in a case where the C content is more than 1.20%, pro-eutectoid cementite precipitates, which may decrease the workability of the filament 10. Therefore, the C content is set in a range of 0.70% to 1.20%. The lower limit value of the C content is preferably 0.75%, 0.80%, or 0.85%. The upper limit value of the C content is preferably 1.10%, 1.05%, or 1.00%.

(Si: 0.15% to 0.60%)

Si is an element which is effective for the deoxidation of the filament 10 and has an effect of improving the strength of the filament 10 when being solid-soluted in ferrite. Here, in a case where the Si content is less than 0.15%, the above-described effect may not be sufficiently obtained. On the other hand, in a case where the Si content is more than 0.60%, the workability of the filament 10 may decrease. Therefore, the Si content is set in a range of 0.15% to 0.60%. The lower limit value of the Si content is preferably 0.20%, 0.25%, or 0.30%, and the upper limit value of the Si content is preferably 0.55%, 0.50%, or 0.45%.

(Mn: 0.10% to 1.00%)

Mn is effective for the deoxidation of the filament 10 and has an effect of suppressing the embrittlement of steel by fixing S in the filament 10. Here, in a case where the Mn content is less than 0.10%, the above-described effect may not be sufficiently obtained. On the other hand, in a case where the Mn content is more than 1.00%, the workability of the filament 10 may decrease. Therefore, the Mn content is set to be in a range of 0.10% to 1.00%. The lower limit value of the Mn content is preferably 0.20%, 0.30%, or 0.40%. The upper limit value of the Mn content is preferably 0.90%, 0.80%, or 0.70%.

(N: 0.0010% to 0.0050%)

N is an element which forms a nitride by being bonded to Al and/or Ti. This nitride has an effect of suppressing the coarsening of austenite contained in an intermediate steel wire before the start of a patenting S04 described below. By suppressing the coarsening of austenite, the difference in average lamellar spacing of the filament 10 can be suppressed to be 2.0 nm or less as described below. Further, by suppressing the coarsening of austenite, pearlite of the filament 10 is refined, and thus the ductility of the filament 10 can be improved. In a case where the N content is less than 0.0010%, the above-described effect may not be sufficiently obtained. On the other hand, in a case where the N content is more than 0.0050%, the ductility of the filament 10 may decrease. Therefore, the N content is set in a range of 0.0010% to 0.0050%. The lower limit value of the N content is preferably 0.0015%, 0.0017%, or 0.0020%, and the upper limit value of the N content is preferably 0.0045%, 0.0042%, or 0.0040%.

P and S may be contained in the filament as impurities. It is not necessary that the P content and the S content are particularly defined. In order to impart ductility to the filament 10 at the same level as that of a filament of the related art, each of the P content and the S content is preferably 0% to 0.02% and is more preferably 0% to 0.01%. S and P having the above-described contents are considered as impurities.

In addition to the base elements and the impurity elements described above, the filament 10 according to the embodiment may further contain at least one selected from the group consisting of Al, Ti, Cr, Co, V, Cu, Nb, Mo, W, B, REM, Ca, Mg, and Zr as an selective element. Hereinafter, the limiting of the contents of the selective elements, and the reason for the limiting will be described. "%" described herein represents "mass %".

(Al: 0% to 0.010%)

Al forms an alumina-based inclusion which is hard and is not likely to be deformed, and this inclusion may cause deterioration in the ductility and drawability of the filament 10. Accordingly, it is preferable that the upper limit value of the Al content is set as 0.010%. In addition, the upper limit value of the Al content may be 0.009%, 0.008%, or 0.007%. Since Al may not be contained in the filament 10 according to the embodiment, the lower limit value of the Al content is 0%. However, Al has an action of forming a nitride by being bonded to N, and, as described above, this nitride has an effect of limiting the difference in average lamellar spacing to be 2.0 nm or less and an effect of improving the ductility of the filament 10 by refining pearlite. In order to obtain these effects, the lower limit value of the Al content may be set as 0.001%, 0.002% or 0.003%.

(Ti: 0% to 0.100%)

Since Ti may not be contained in the filament 10 according to the embodiment, the lower limit value of the Ti content is 0%. However, Ti is an element having a deoxidation effect. Ti has an action of forming a nitride by being bonded to N, and, as described above, this nitride has an effect of suppressing the difference in average lamellar spacing to be 2.0 nm or less and an effect of improving the ductility of the filament 10 by refining pearlite. In order to obtain these effects, 0.005% or more of Ti may be contained.

On the other hand, in a case where the Ti content is more than 0.100%, a coarse carbon nitride (for example, TiCn) is formed, which may decrease the workability. Accordingly, it is preferable that the upper limit value of the Ti content is set as 0.100%.

(Cr: 0% to 0.50%)

Since Cr may not be contained in the filament 10 according to the embodiment, the lower limit value of the Cr content is 0%. However, Cr has an effect of improving the tensile strength of the filament 10 by reducing the average lamellar spacing of pearlite. In order to obtain this effect, the Cr content is preferably more than 0% and is more preferably 0.0010% or more. On the other hand, in a case where the Cr content is more than 0.50%, pearlite transformation is suppressed. As a result, austenite may remain in a metallographic structure of an intermediate steel wire during a patenting treatment. Residual austenite becomes a supercooled structure such as martensite, bainite, and the like after the patenting treatment, which deteriorates the characteristics of the filament 10. In addition, when the Cr content is more than 0.50%, it may be difficult to remove a surface oxide through mechanical descaling. Accordingly, the Cr content is preferably 0.50% or less, and more preferably 0.40% or less.

(Co: 0% to 0.50%)

Since Co may not be contained in the filament 10 according to the embodiment, the lower limit value of the Co content is 0%. However, Co is an element having an effect of improving the characteristics of the filament 10 by suppressing the precipitation of pro-eutectoid cementite. In order to obtain this effect, the Co content is preferably more than 0% and more preferably 0.0010% or more. On the other hand, in a case where the Co content is more than 0.50%, the above-described effect is saturated, and the production costs may be excessive. Accordingly, the Co content is preferably 0.50% or less and is more preferably 0.40% or less.

(V: 0% to 0.50%)

Since V may not be contained in the filament 10 according to the embodiment, the lower limit value of the V content is 0%. However, V has an action of forming a fine carbon nitride by being bonded to N. As described above, this nitride has an effect of suppressing the difference in average lamellar spacing to be 2.0 nm or less and an effect of improving the ductility of the filament 10 by refining pearlite. In order to obtain these effects, the V content is preferably more than 0% and is more preferably 0.0010% or more. On the other hand, in a case where the V content is more than 0.50%, the amount of a carbon nitride formed may be excessive. Further, the particle size of the carbon nitride may increase. This carbon nitride may decrease the ductility of the filament. Accordingly, the V content is preferably 0.50% or less and is more preferably 0.40% or less.

(Cu: 0% to 0.20%)

Since Cu may not be contained in the filament 10 according to the embodiment, the lower limit value of the Cu content is 0%. However, Cu is an element of improving the corrosion resistance of the filament 10. In order to obtain this effect, the Cu content is preferably more than 0% and is more preferably 0.0001% or more. On the other hand, in a case where the Cu content is more than 0.20%, CuS segregates in a grain boundary due to a reaction of Cu and S, and CuS may cause a defect to occur in the filament 10. Accordingly, the Cu content is preferably 0.20% or less and is more preferably 0.10% or less.

(Nb: 0% to 0.100%)

Since Nb may not be contained in the filament 10 according to the embodiment, the lower limit value of the Nb content is 0%. However, Nb is an element of improving the corrosion resistance of the filament 10. In addition, Nb has an action of forming a carbide and/or a nitride. As described above, this carbide and/or nitride has an effect of suppressing the difference in average lamellar spacing to be 2.0 nm or less and an effect of improving the ductility of the filament 10 by refining pearlite. In order to obtain these effects, the Nb content is preferably more than 0% and is more preferably 0.0005% or more. On the other hand, in a case where the Nb content is more than 0.100%, pearlite transformation is suppressed during a patenting treatment. As a result, austenite may remain. Residual austenite becomes a supercooled structure such as martensite, bainite, and the like after the patenting treatment, which deteriorates the characteristics of the filament 10. Accordingly, the Nb content is preferably 0.100% or less and is more preferably 0.050% or less.

(Mo: 0% to 0.20%)

Since Mo may not be contained in the filament 10 according to the embodiment, the lower limit value of the Mo content is 0%. However, Mo is an element which is concentrated in a pearlite growth interface and suppresses the growth of pearlite due to a so-called solute drag effect. As a result, pearlite is refined, and the characteristics of the filament 10 can be improved. In addition, Mo is an element which reduces the amount of a non-pearlite structure having an adverse effect on the characteristics of the filament 10 by suppressing the production of ferrite. In order to obtain these effects, the Mo content is preferably more than 0% and is more preferably 0.0010% or more, and is more preferably 0.005% or more. On the other hand, in a case where the Mo content is more than 0.20%, the growth of pearlite is excessively suppressed, a long period of time is required for a patenting treatment, which may cause a decrease in the productivity of the filament 10. In addition, in a case where the Mo content is more than 0.20%, a coarse Mo carbide precipitates, and the drawability of the filament 10 may decrease. Accordingly, the Mo content is preferably 0.20% or less and is more preferably 0.06% or less.

(W: 0% to 0.200%)

Since W may not be contained in the filament 10 according to the embodiment, the lower limit value of the W content is 0%. However, as in the case of Mo, W is an element which is concentrated in a pearlite growth interface and suppresses the growth of pearlite due to a so-called solute drag effect. As a result, pearlite is refined, and the characteristics of the filament 10 can be improved. In addition, W is an element which reduces the amount of a non-pearlite structure having an adverse effect on the characteristics of the filament 10 by suppressing the production of ferrite. In order to obtain these effects, the W content is preferably more than 0% and more preferably 0.0005% or more. On the other hand, in a case where the W content is more than 0.200%, the growth of pearlite is excessively suppressed, a long period of time is required for a patenting treatment, which may cause a decrease in the productivity of the filament 10. In addition, in a case where, the W content is more than 0.200%, a coarse W carbide precipitates, and the drawability of the filament 10 may decrease. Accordingly, the W content is preferably 0.200% or less and is more preferably 0.060% or less.

(B: 0% to 0.0030%)

Since B may not be contained in the filament 10 according to the embodiment, the lower limit value of the B content is 0%. However, B is an element which suppresses the production of a non-pearlite structure such as ferrite, degenerate pearlite, bainite, and the like. In addition, B has an action of forming a carbide and/or a nitride. As described above, this carbide and/or nitride has an effect of limiting the difference in average lamellar spacing to be 2.0 nm or less and an effect of improving the ductility of the filament 10 by refining pearlite. In order to obtain these effects, the B content is preferably more than 0%, is more preferably 0.0004% or more, and is even more preferably 0.0006% or more. On the other hand, in a case where the B content is more than 0.0030%, the precipitation of a coarse $Fe_{23}(CB)_6$ is promoted, which may have an adverse effect on the ductility of the filament 10. Accordingly, the B content is preferably 0.0030% or less, is more preferably 0.0025% or less, is still more preferably 0.0015% or less, and is even more preferably 0.0012%.

(REM: 0% to 0.0050%)

Since rare earth metal (REM) may not be contained in the filament 10 according to the embodiment, the lower limit value of the REM content is 0%. However, REM is a deoxidizing element. In addition, REM is an element which detoxifies S as an impurity by forming a sulfide. In order to obtain this effect, the REM content is preferably more than 0% and is more preferably 0.0005% or more. On the other hand, in a case where the REM content is more than 0.0050%, a coarse oxide is formed, which may cause wire breaking during the drawing of the filament 10. Accordingly, the REM content is preferably 0.0050% or less and is more preferably 0.0020% or less.

REM is a collective term for 17 elements in total including not only 15 elements, which range from lanthanum with an atomic number of 57 and lutetium with an atomic number of 71, but also scandium with an atomic number of 21 and yttrium with an atomic number of 39. Typically, REM is supplied in the form of mischmetal which is a mixture of the elements and is added to steel. The REM content refers to the total amount of the above-described elements.

(Ca: 0% to 0.0050%)

Since Ca may not be contained in the filament 10 according to the embodiment, the lower limit value of the Ca content is 0%. However, Ca is an element which reduces the amount of a hard alumina-based inclusion deteriorating the characteristics of the filament 10. In addition, Ca is an element which produces a fine oxide. This fine oxide reduces a pearlite block size of the filament 10. As a result, the ductility of the filament 10 is improved. In order to obtain these effects, it is preferable that the Ca content is more than 0.0005%. On the other hand, in a case where the Ca content is more than 0.0050%, a coarse oxide is formed, which may cause wire breaking during the drawing of the filament 10. Accordingly, the Ca content is preferably 0.0050% or less and is more preferably 0.0040% or less. Under typical operating conditions, about 0.0003% of Ca may be contained.

(Mg: 0% to 0.0050%)

Since Mg may not be contained in the filament 10 according to the embodiment, the lower limit value of the Mg content is 0%. However, Mg is an element which produces a fine oxide. This fine oxide reduces a pearlite block size of the filament. As a result, the ductility of the filament 10 is improved. In order to obtain this effect, it is preferable that the Mg content be more than 0.0005%. However, in a case where the Mg content is more than 0.0050%, a coarse oxide is formed, which may cause wire breaking during the drawing of the filament 10. Accordingly, the Mg content is preferably 0.0050% or less and is more preferably 0.0040% or less. Under typical operating conditions, about 0.0001% of Mg may be contained.

(Zr: 0% to 0.0100%)

Since Zr may not be contained in the filament 10 according to the embodiment, the lower limit value of the Zr content is 0%. However, Zr functions as crystallization nuclei of austenite when being crystallized as ZrO. Therefore, Zr is an element which improves the equiaxed grain ratio of austenite and refines austenite grains. In a case where the filament 10 according to the embodiment contains Zr, austenite before a patenting treatment is refined, and thus the pearlite block size of the filament 10 is reduced. As a result, the ductility of the filament 10 is improved. In order to obtain this effect, it is preferable that the Zr content is more than 0.0005%. On the other hand, in a case where the Zr content is more than 0.0100%, a coarse oxide is formed, which may cause wire breaking during the drawing of the filament 10. Accordingly, the Zr content is preferably 0.0100% or less and is more preferably 0.0050% or less.

(Remainder Including Fe and Impurities)

The remainder of the chemical composition of the filament 10 according to the embodiment includes Fe and impurities. Here, the impurities refer to elements which are, when steel is industrially manufactured, incorporated from raw materials such as ore or scrap or incorporated by various factors of the manufacturing process, and the impurities are allowed to be included in the steel in a range not adversely affecting the characteristics of the filament 10 according to the embodiment.

(Tensile Strength: 3200 MPa or Higher)

The tensile strength of the filament 10 according to the embodiment is 3200 MPa or higher. A steel cord which is obtained using the filament 10 having a tensile strength of 3200 MPa or higher is suitable as a reinforcing material of a rubber product such as an automobile tire, a high-pressure rubber hose, a conveyor belt, and the like.

Next, a method for manufacturing the filament 10 according to the embodiment and a method for manufacturing a steel cord using the filament 10 will be described using FIGS. 10 to 14. The method for manufacturing the filament 10 according to the embodiment includes: descaling a wire rod to remove oxidized scales on a surface of the wire rod (descaling S01); rough-drawing the descaled wire rod to obtain an intermediate steel wire (rough drawing S02); heating the rough-drawn intermediate steel wire (heating S03); performing a patenting treatment on the heated intermediate steel wire (patenting S04); brass plating the steel wire (brass plating S06); finish-drawing the brass-plated steel wire to obtain an intermediate filament (finish drawing S07); surface layer heating the intermediate filament (filament surface layer heating S08); and cooling the surface-layer-heated filament (cooling S09). As described below, the intermediate steel wire refers to the steel wire before termination of the patenting S04, and the intermediate filament refers to the filament 10 in the process of manufacturing. The method for manufacturing the filament 10 according to the embodiment may include heating the surface layer of the steel wire (steel wire surface layer heating S05) between patenting the steel wire and brass plating the steel wire. Surface layer heating refers to heating only the surface layer of the filament or the steel wire. The method for manufacturing a high-strength steel cord using the filament 10 according to the embodiment includes stranding filaments 10 according to the embodiment (stranding S10).

(Descaling S01)

In the method for manufacturing the filament 10 according to the embodiment, a wire rod having the above-described chemical composition is used as a raw material. The kind of the wire rod is not particularly limited but is preferably a hot-rolled wire rod. The diameter of the wire rod is not particularly limited but is preferably about 5.5 mm. The oxidized scales formed on the surface of the wire rod are removed through a chemical treatment such as pickling, or a mechanical treatment. Such a treatment is called descaling. The method for descaling is not particularly limited.

(Rough Drawing S02)

Next, the wire rod from which the oxidized scales are removed is rough-drawn. As a result, an intermediate steel wire having a diameter of 1.0 mm to 3.5 mm is formed (rough drawing S02). A method for rough drawing is not particularly limited, but rough drawing is preferably performed through dry drawing. In order to distinguish a steel wire which is obtained after termination of patenting and a steel wire before termination of the patenting, the steel wire before termination of the patenting may be called an intermediate steel wire.

(Heating S03)

Next, the intermediate steel wire which is obtained in the rough drawing S02 are heated to a temperature range of 850° C. to 1350° C. (heating S03). In the heating S03, a metallographic structure of the intermediate steel wire is transformed into austenite, and this austenite is transformed into pearlite in the patenting S04 described below. Accordingly, the state of austenite which is produced in the intermediate steel wire in the heating S03 affects the state of pearlite contained in the steel wire which is obtained after the patenting S04, and in the final filament.

In a case where the heating temperature in the heating S03 is lower than 850° C., cementite remains in the intermediate steel wire without solid solution, and ferrite is produced in the intermediate steel wire. In this case, a sufficient amount of austenite cannot be obtained. Therefore, in the next patenting S04, a sufficient amount of pearlite cannot be produced, and the amount of pearlite in the metallographic structure of the center portion 12 of the final filament is lower than 95%. On the other hand, in a case where the heating temperature in the heating S03 is higher than 1350° C., the grain size of austenite increases, and hardenability is improved. Therefore, the difference in average lamellar spacing of the final filament may be more than 2.0 nm.

Figure 11:
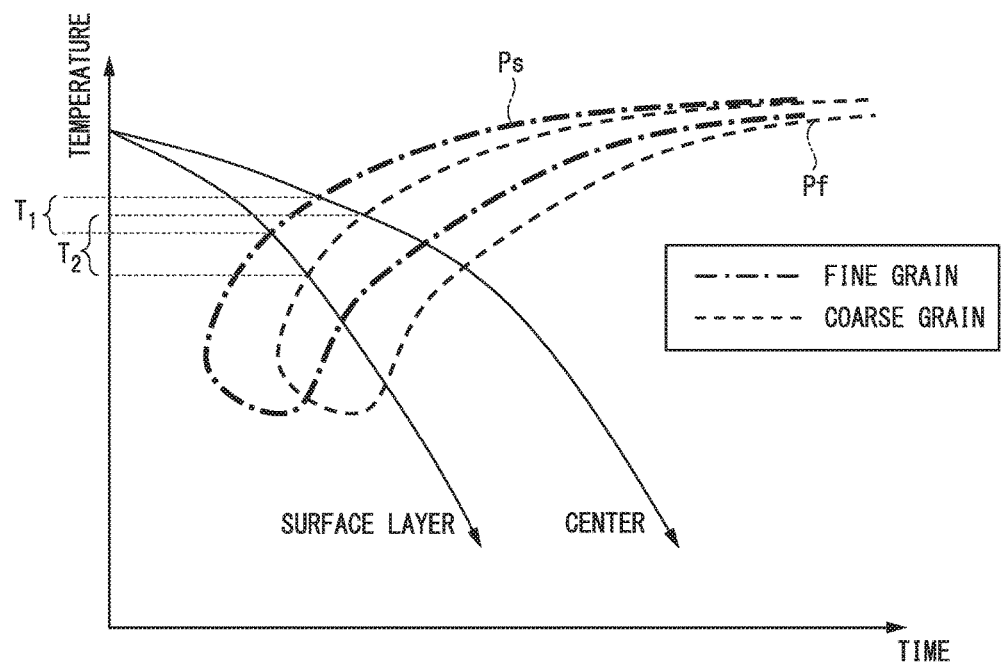
FIG. 11 is a schematic CCT diagram of a steel wire which is raw material of the filament according to the embodiment.
Figure 12:
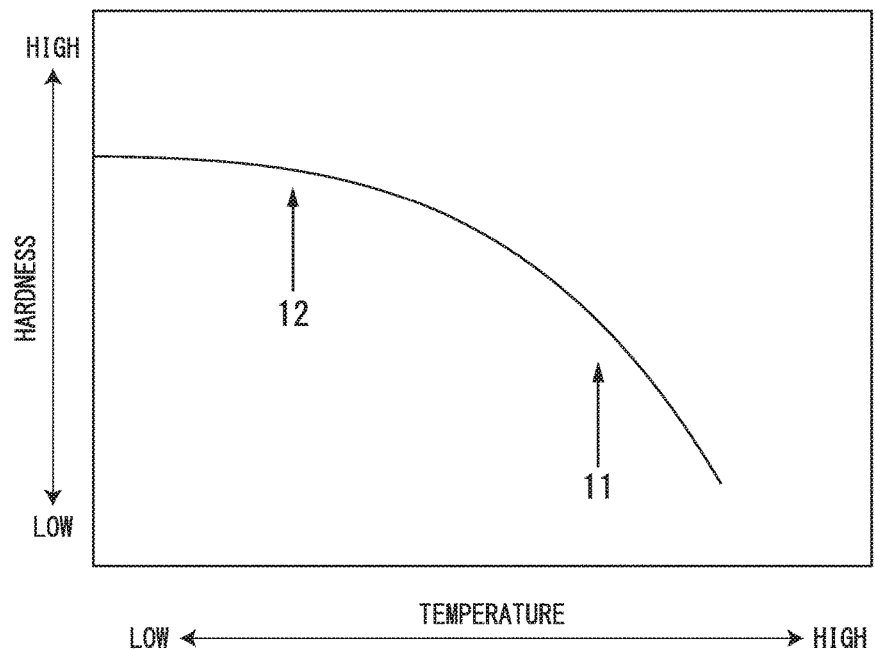
FIG. 12 is a conceptual diagram showing a relationship between a heat treatment temperature and a hardness of pearlite steel.

The reason why the difference in average lamellar spacing increases due to the coarsening of austenite will be described below using FIG. 11. FIG. 11 is a schematic continuous-cooling-transformation (CCT) diagram of the steel wire which is raw material of the filament according to the embodiment. Two curves ranging from Ps to Pf are transformation curves indicating the start and the end of the pearlite transformation. Among the two transformation curves, the transformation curve on the left side is a transformation curve of an intermediate steel wire having a small austenite grain size, and the transformation curve on the right side is a transformation curve of an intermediate steel wire having a large austenite grain size. As the austenite grain size increases, the period of time from the start of patenting to the pearlite transformation is long. Therefore, the transformation curve of the intermediate steel wire having a large austenite grain size is positioned on the right side. In the CCT diagram, two curves extending from the upper left to the lower right are curves indicating the cooling state of the intermediate steel wire in the patenting S04 which is performed after the heating S03. Among the two curves, the curve on the left side indicates the cooling state of the surface layer of the intermediate steel wire, and the curve on the right side indicates the cooling state of the center of the intermediate steel wire. It is more difficult to cool the center of the intermediate steel wire than the surface layer of the intermediate steel wire. Therefore, the curve of the center of the intermediate steel wire is positioned on the right side. $T_1$ shown in FIG. 11 indicates a difference between a temperature, at which the transformation curve of the intermediate steel wire having a small austenite grain size initially intersects with the curve indicating the cooling state of the surface layer of the intermediate steel wire, and a temperature at which the transformation curve of the intermediate steel wire having a small austenite grain size initially intersects with the curve indicating the cooling state of the center of the intermediate steel wire. That is, $T_1$ indicates a difference in pearlite transformation start temperature between the surface layer and the center of the intermediate steel wire having a small austenite grain size. $T_2$ shown in FIG. 11 indicates a difference between a temperature, at which the transformation curve of the intermediate steel wire having a large austenite grain size initially intersects with the curve indicating the cooling state of the surface of the intermediate steel wire, and a temperature at which the transformation curve of the intermediate steel wire having a large austenite grain size initially intersects with the curve indicating the cooling state of the center of the intermediate steel wire. That is, $T_2$ indicates a difference in pearlite transformation start temperature between the surface layer and the center of the intermediate steel wire having a large austenite grain size.

When the pearlite transformation start temperature is low, the lamellar spacing of pearlite decreases. Accordingly, in a case where the difference between the pearlite transformation start temperature of the surface layer and the pearlite transformation start temperature of the center in the intermediate steel wire is large, the difference between the average lamellar spacing of the surface layer and the average lamellar spacing of the center in the intermediate steel wire increases. As shown in FIG. 11, $T_2$ is larger than $T_1$. Accordingly, in a case where austenite of the intermediate steel wire, which is heated in the heating S03, is coarsened, the difference in average lamellar spacing between the surface layer and the center of the intermediate steel wire increases in the next patenting S04. The difference in average lamellar spacing which occurs in the intermediate steel wire affects the difference in average lamellar spacing of the final filament 10. As a result of investigation in which an experiment was performed multiple times, the present inventors found that, in a case where the heating temperature is higher than 1350° C., the difference in average lamellar spacing of the filament 10 is highly likely to be 2.0 nm or more due to an increase in the austenite grain size of the intermediate steel wire. Due to the above-described reason, it is necessary that the heating temperature in the heating S03 is 850° C. to 1350° C.

(Patenting S04)

Next, a patenting treatment of dipping the intermediate steel wire heated in the heating S03 in a molten lead bath (lead bath) after the completion of the heating S03 is performed (patenting S04). The temperature of the lead bath is set to be 530° C. to 580° C., and the dipping time of the intermediate steel wire in the lead bath is set to be 5 seconds to 45 seconds. In addition, a period of time from the end of the heating S03 to the start of the patenting S04 is about 5 seconds. The patenting treatment may be performed using a molten salt instead of the molten lead.

The reason for limiting the temperature of the molten lead in the patenting S04 is as follows. In a case where the temperature of the lead bath is lower than 530° C., a bainite structure is produced in the surface layer of the intermediate steel wire. As a result, the tensile strength of the filament 10 decreases. In addition, in a case where the temperature of the lead bath is higher than 580° C., the tensile strength of the filament 10 decreases. In order to obtain a sufficient tensile strength, it is preferable that the temperature of the lead bath is 530° C. to 580° C.

The reason for limiting the dipping time of the intermediate steel wire in the lead bath in the patenting S04 is as follows. In a case where the dipping time is less than 5 seconds, the pearlite transformation is not completely finished, and the fraction of pearlite of the filament 10 decreases. In addition, in a case where the dipping time is 45 seconds or longer, a part of cementite in the lamellar of pearlite is fragmented. As a result, the tensile strength of the filament 10 decreases.

After being extracted from the lead bath in the patenting S04, the steel wire is cooled to room temperature. At this time, the cooling rate is 10° C./sec or faster. In a case where the cooling rate of the steel wire is slower than 10° C./sec, the strength of the filament 10 may decrease.

(Brass Plating S06)

The surface of the steel wire patented in the patenting S04 is brass-plated (brass plating S06). The brass plating is formed to improve adhesion between rubber and the steel cord.

(Finish Drawing S07)

By performing wet drawing on the steel wire which is brass-plated in the brass plating S06, an intermediate filament having a diameter of 0.15 mm to 0.35 mm is formed (finish drawing S07). In order to distinguish a filament according to the embodiment which is obtained after termination of all processes and a filament in the process of manufacturing, the filament in the process of manufacturing may be called an intermediate filament and the filament according to the embodiment which is obtained after termination of all processes may be called a final filament.

(Filament Surface Layer Heating S08)

Next, by performing high-frequency heating on the intermediate filament having undergone the finish drawing S07 at a frequency of 50 kHz or higher, surface layer heating of heating the surface temperature of the intermediate filament to be in a range of 300° C. to 600° C. is performed (filament surface layer heating S08). At this time, it is necessary that the heating time to be 5 seconds or shorter. In the filament surface layer heating S08, only the surface layer of the intermediate filament is heated. As a result, among dislocations introduced during the pearlite transformation in the patenting S04 and during the wet drawing in the finish drawing S06, most of dislocations in the surface layer of the intermediate filament are removed. Therefore, there is a difference in hardness between the vicinity of the center and the surface layer part in the intermediate filament, and the soft portion 11 having a thickness of 1 μm or more is formed.

In the filament surface layer heating S08, it is necessary to sufficiently heat the surface layer of the intermediate filament as well as to suppress an increase in the internal temperature of the intermediate filament to be as low as possible. In a case where the inside of the intermediate filament is excessively heated, the final filament which includes the soft portion 11 having a thickness of 1 μm or more cannot be obtained. Due to the high-frequency heating, only the surface layer of the filament can be heated. The best heating method for forming a predetermined soft portion 11 is high-frequency heating. In a case where the high-frequency heating is performed, it is necessary that the high frequency applied to the intermediate filament is 50 kHz or higher. In a case where the frequency during the high-frequency heating is lower than 50 kHz, the inside of the intermediate filament is also heated, and thus, the final filament which includes the soft portion 11 having a thickness of 1 μm or more cannot be obtained. The upper limit value of the high frequency applied to the intermediate filament is not particularly limited. However, in consideration of plant capacity, it is preferable that the upper limit value of the high frequency is 100 kHz. The high-frequency heating can be performed by allowing the intermediate filament to continuously pass through the inside of a high frequency coil. Therefore, not only the above-described heating rate but also the production efficiency are satisfactory, and thus the high-frequency heating is preferable. In addition, according to the high-frequency heating, uniform heating can be performed. Therefore, the depth of the soft portion 11 obtained by the high-frequency heating is substantially constant.

In the filament surface layer heating S08, it is necessary that the surface temperature of the intermediate filament is 300° C. or higher. In a case where the surface temperature of the intermediate filament is lower than 300° C., dislocations in the surface layer of the intermediate filament are not sufficiently removed, and thus, the soft portion 11 having a thickness of 1 μm or more cannot be formed. On the other hand, in a case where the surface temperature of the intermediate filament is higher than 600° C. in the filament surface layer heating S08, cementite in the lamellar of pearlite is fragmented and spheriodized. As a result, the tensile strength of the final filament decreases.

In addition, in the filament surface layer heating S08, it is necessary to perform the heating rapidly in order to avoid an increase in the internal temperature of the intermediate filament. Accordingly, it is necessary that the heating time in the filament surface layer heating S08 is set to be within 5 seconds. In a case where the surface layer heating is performed by high-frequency heating, the heating time is a period of time during which the intermediate filament passes through a high frequency coil, and can be obtained by divide the length of the high frequency coil by the passage speed of the filament. It is not necessary to limit the temperature at which the surface layer heating starts. However, in order to control the surface temperature of the intermediate filament to be 300° C. or higher within 5 seconds, it is preferable that the temperature at which the surface layer heating starts is set to be 10° C. or higher.

Instead of the high-frequency heating, another method capable of performing heating under the same conditions as the above-described high-frequency heating conditions may be applied to the filament surface layer heating S08. However, a heating method using a heating furnace which is typically used for the heat treatment of the filament cannot be performed under the same conditions as the above-described heating conditions, and thus, cannot form the soft portion 11 having a thickness of 1 μm to 0.1×r mm.

(Cooling S09)

Figure 13:
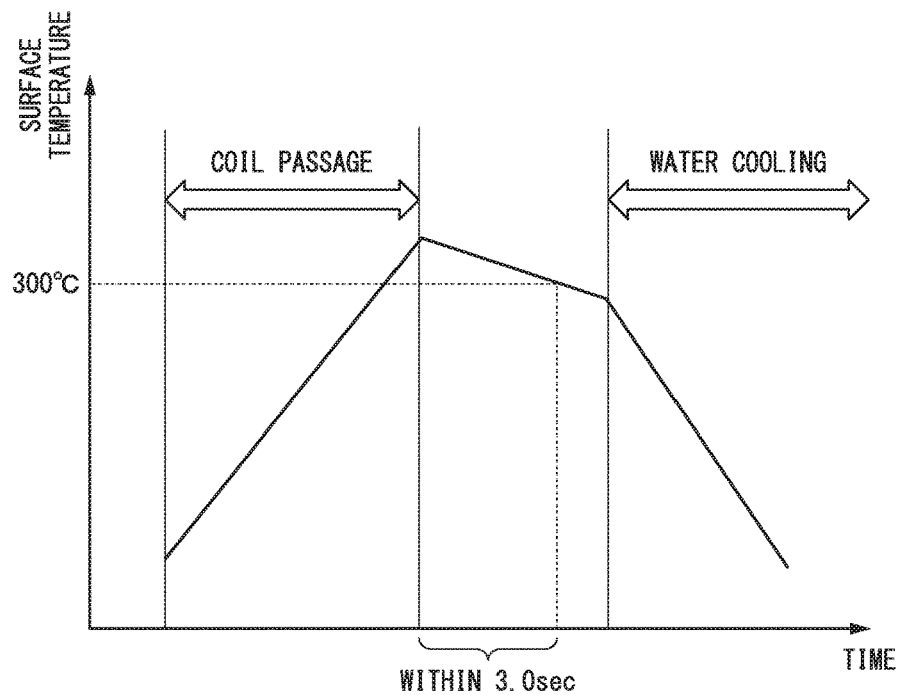
FIG. 13 is a diagram showing a method for cooling the filament according to the embodiment after filament surface layer heating.

The intermediate filament in which only the surface layer is heated in the filament surface layer heating S08 is cooled in the cooling S09. At this time, as shown in FIG. 13, it is necessary to control the surface temperature of the intermediate filament to be 300° C. or lower within 3.0 seconds after the completion of the filament surface layer heating S08. It is preferable to control the surface temperature of the intermediate filament to be 300° C. or lower within 2.0 seconds after the completion of the filament surface layer heating S08. In a case where the filament surface layer heating S08 is performed by high-frequency heating, the time of completion of the filament surface layer heating S08 is the time at which the intermediate filament exits from the high-frequency heating coil. In a case where the above-described cooling conditions are not achieved, the inside of the intermediate filament is softened, and thus, the soft portion 11 having a thickness of 1 μm to 0.1×r mm cannot be formed.

A cooling method in the cooling S09 is not particularly limited as long as the above-described cooling conditions are achieved. When the surface heating temperature in the filament surface layer heating S08 is 300° C. or is slightly higher than 300° C., the above-described cooling conditions can be achieved by air cooling. However, due to disturbance factors such as an atmosphere temperature, the surface temperature of the intermediate filament at the time of completion of the filament surface layer heating S08 may be unexpectedly higher than 300° C., and the above-described cooling conditions may not be achieved by air cooling. On the other hand, by water-cooling the intermediate filament within 3.0 seconds after the completion of the filament surface layer heating S08, the above-described cooling conditions can be achieved reliably.

Through the above-described S01 to S08, the filament 10 according to the embodiment (final filament) is manufactured. After the completion of the cooling S09, it is not preferable to perform an additional heat treatment on the filament 10. The reason for this is as follows: in a case where the inside of the filament 10 is heated by the additional heat treatment, the hardness of the inside of the filament 10 decreases, and thus the soft portion 11 having a thickness of 1 μm to 0.1×r mm may be lost.

Hereinafter, an example of the method for manufacturing a steel cord using the filament 10 according to the embodiment will be described. However, a method for processing the filament 10 according to the embodiment is not limited to the following exemplary method.

(Stranding S10)

In the method for manufacturing the steel code using the filament 10 according to the embodiment, a plurality of filaments 10 are stranded (stranding S10). As a result, a high-strength steel cord having a stranded wire structure is manufactured.

Hereinabove, the filament 10 according to the embodiment, the method for manufacturing the filament 10 according to the embodiment, and the method for manufacturing a steel cord using the filament 10 according to the embodiment have been described. The filament 10 according to the embodiment having the above-described configuration includes the soft portion 11 and the center portion 12, in which the soft portion 11 has a lower Vickers hardness than the center portion 12, and in which a difference between the Vickers hardness of the soft portion 11 and the Vickers hardness of the portion of the filament 10 at a depth of ¼ of the diameter r is Hv 50 or higher. The ductility of the soft portion 11 is improved, and the tensile strength of the center portion 12 is maintained to be high. Accordingly, in the filament 10 according to the embodiment, defects such as cracking are suppressed in the stranding S10. In addition, the filament 10 according to the embodiment can be stranded favorably in the stranding S10. Therefore, by using the filament 10 according to the embodiment, a high-quality high-strength steel cord in which stranding defects are suppressed can be manufactured. On the other hand, the filament 10 according to the embodiment has a high tensile strength.

In addition, the filament 10 according to the embodiment includes as a chemical composition, by mass %, C: 0.70% to 1.20%, Si: 0.15% to 0.60%, Mn: 0.10% to 1.00%, N: 0.0010% to 0.0050%, Al: 0% to 0.010%, Ti: 0% to 0.10%, Cr: 0% to 0.50%, Co: 0% to 0.50%, V: 0% to 0.50%, Cu: 0% to 0.20%, Nb: 0% to 0.100%, Mo: 0% to 0.20%, W: 0% to 0.200%, B: 0% to 0.0030%, REM: 0% to 0.0050%, Ca: 0% to 0.0050%, Mg: 0% to 0.0050%, Zr: 0% to 0.0100%, and a remainder including Fe and impurities. A metallographic structure of the center portion 12 of the filament 10 according to the embodiment contains 95% to 100% of pearlite by area %. Accordingly, in the center portion 12 of the filament 10 according to the embodiment, the tensile strength is sufficiently maintained to be high. The steel cord which is manufactured using the filament 10 according to the embodiment can also be made to have a high tensile strength.

In addition, in the filament 10 according to the embodiment, the thickness t of the soft portion 11 is within a range of 1 μm≤t≤0.1×r mm. Therefore, in the filament 10 according to the embodiment, the workability of the filament 10 can be sufficiently secured, defects such as cracking can be suppressed in the stranding S10, and the strength of the filament 10 can be sufficiently secured.

The method for manufacturing the filament 10 according to the embodiment includes the filament surface layer heating S08 of heating the surface temperature of the intermediate filament to be 300° C. or higher by, for example, performing high-frequency heating on the intermediate filament obtained by the finish drawing S07 at a frequency of 50 kHz or higher. Accordingly, in the method for manufacturing the filament 10 according to the embodiment, there is a difference in temperature between the inside and the surface layer of the filament, and the soft portion 11 and the center portion 12 having different hardnesses and lamellar spacings from each other can be formed.

Figure 10:
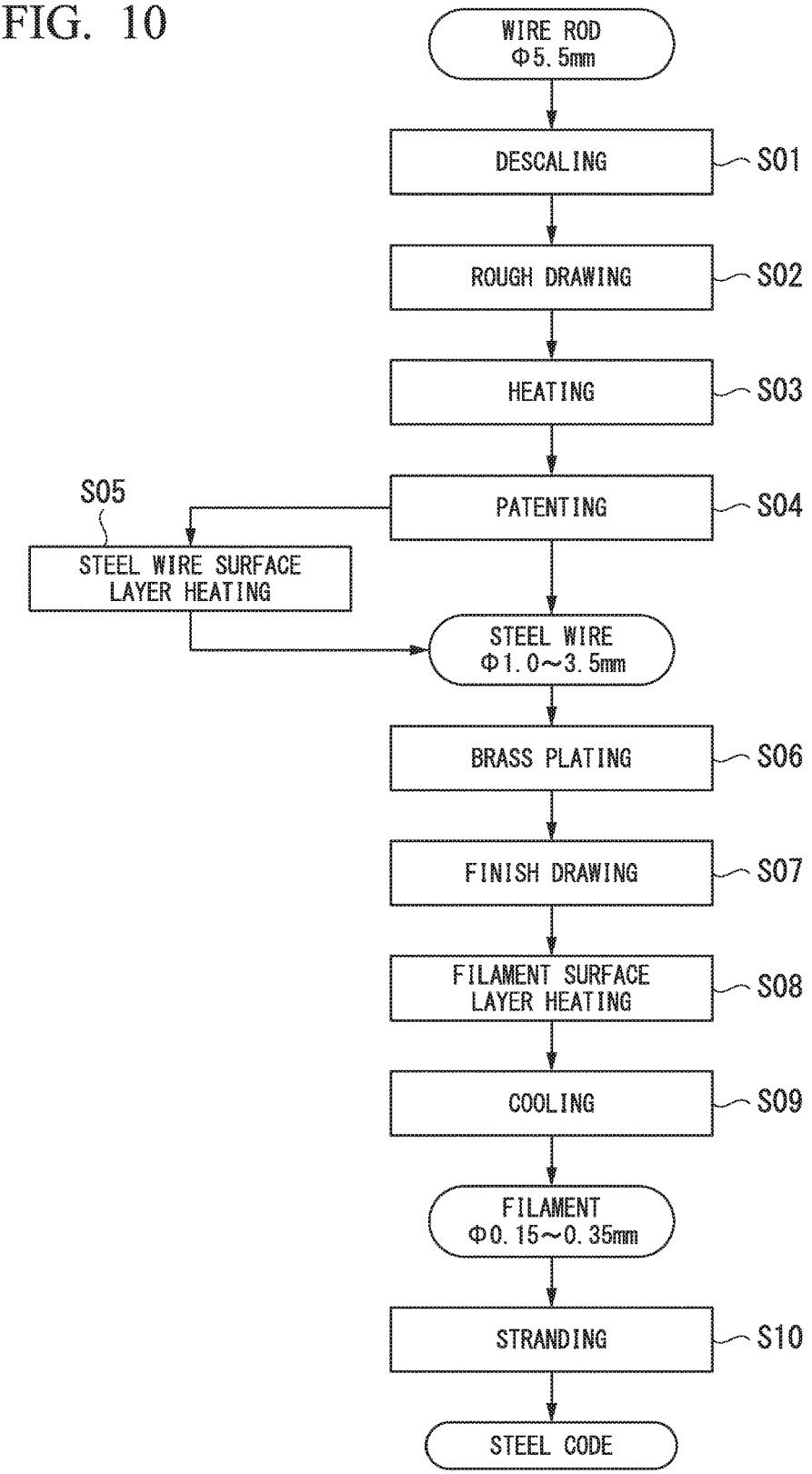
FIG. 10 is a flowchart showing a method for manufacturing the filament according to the embodiment.
Figure 14:
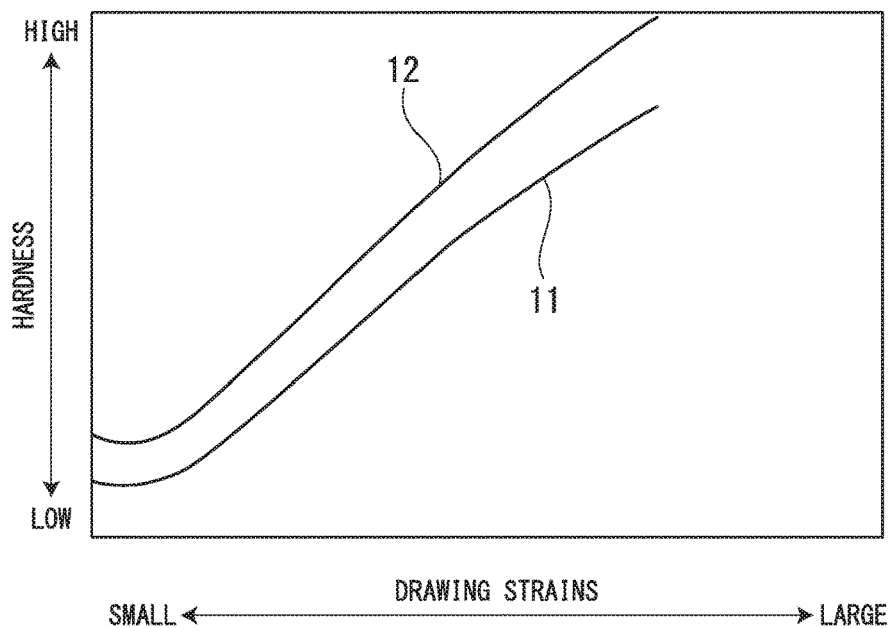
FIG. 14 is a conceptual diagram showing a work hardening curve of the filament according to the embodiment.

Hereinabove, the filament 10 according to the embodiment has been described, but the present invention is not limited thereto. Within a range not departing from the technical scope of the present invention, various modifications can be made. For example, the thickness of the soft portion is not limited to the embodiment. In addition, the diameter of the wire rod, the diameter of the filament, and the like can be appropriately modified without being limited to the embodiment. Furthermore, as shown in FIG. 10, the method for manufacturing the filament 10 according to the embodiment may include steel wire surface layer heating S05, in which the surface layer temperature of the steel wire is heated to be 500° C. or higher by performing high-frequency heating at a frequency of 50 kHz or higher between the patenting S04 and the brass plating S06. By the steel wire surface layer heating S05, there is a difference in temperature between the inside and the surface layer part of the steel wire, and the soft portion and the center portion having different hardnesses and lamellar spacings can be formed. When drawing (finish drawing S07) is performed on the steel wire, the difference in hardness between the surface layer portion and the center portion further increases, as shown in FIG. 14.

Examples

Hereinafter, the results of a confirmatory experiment which was performed to confirm the effects of the present invention will be described.

Filaments having chemical compositions as shown in Tables 1-1, 1-2, 2-1, and 2-2 were prepared. The amounts of P and S contained in each of the chemical compositions of the filaments of Examples 1 to 25 and the filaments of Comparative Examples 26 to 46 were at a level at which P and S were able to be considered to be impurities.

The filaments of Examples 1 to 25 and the filaments of Comparative Examples 26 to 36 were manufactured using the method for manufacturing the filament according to the embodiment.

A filament of Comparative Example 37 was manufactured using a manufacturing method based on the method for manufacturing the filament according to the above-described embodiment, except that the filament surface layer heating S08 was not performed.

A filament of Comparative Example 38 was manufactured using a manufacturing method based on the method for manufacturing the filament according to the above-described embodiment, except that the heating temperature in the heating S03 was 1380° C. (that is, higher than 1350° C.).

A filament of Comparative Example 39 was manufactured using a manufacturing method based on the method for manufacturing the filament according to the above-described embodiment, except that the heating temperature in the heating S03 was 830° C. (that is, lower than 850° C.).

A filament of Comparative Example 40 was manufactured using a manufacturing method based on the method for manufacturing the filament according to the above-described embodiment, except that the dipping time in the lead bath in the patenting S04 was 4 seconds (that is, less than 5 seconds).

A filament of Comparative Example 41 was manufactured using a manufacturing method based on the method for manufacturing the filament according to the above-described embodiment, except that the dipping time in the lead bath in the patenting S04 was 50 seconds (that is, longer than 45 seconds).

A filament of Comparative Example 42 was manufactured using a manufacturing method based on the method for manufacturing the filament according to the above-described embodiment, except that the cooling rate after the dipping in the lead bath in the patenting S04 was 8° C./sec (that is, slower than 10° C./sec).

A filament of Comparative Example 43 was manufactured using a manufacturing method based on the method for manufacturing the filament according to the above-described embodiment, except that the frequency of the high-frequency heating performed in the filament surface layer heating S08 was 30 kHz (that is, lower than 50 kHz).

A filament of Comparative Example 44 was manufactured using a manufacturing method based on the method for manufacturing the filament according to the above-described embodiment, except that the surface layer heating temperature in the filament surface layer heating S08 was 280° C. (that is, lower than 300° C.).

A filament of Comparative Example 45 was manufactured using a manufacturing method based on the method for manufacturing the filament according to the above-described embodiment, except that the surface layer heating temperature in the surface layer heating S05 was 620° C. (that is, higher than 600° C.).

A filament of Comparative Example 46 was manufactured using a manufacturing method based on the method for manufacturing the filament according to the above-described embodiment, except that the time required to control the surface layer temperature in the cooling S06 to be 500° C. or lower was 4 seconds (that is, longer than 3 seconds).

Regarding each of the obtained filaments 1 to 46, the amount of pearlite, the diameter r, the thickness of the soft portion, the hardness of the surface layer, the hardness of the center portion, the average lamellar spacing of the surface layer portion, the average lamellar spacing of the center portion, the difference in average lamellar spacing, whether or not delamination occurred, and the tensile strength TS were evaluated.

The amount of pearlite in the center portion of the filament was the average value of the amounts of pearlite measured at the center of the C cross-section of the filament and at eight positions in the ¼ depth region of the C cross-section of the filament which were arranged at an angle interval of 45° with respect to the center of the filament. The amount of pearlite at each of the measurement positions was obtained based on an optical microscope image or a SEM image of the C cross-section of the filament where the pearlite structure appeared.

The thickness of the soft portion was obtained based on the hardness distribution of the filament in the depth direction which was obtained by measuring the hardness of the filament. The graph showing the relationship between the depth and the hardness of the filament, such as the graph shown in FIG. 2, was obtained by appropriately preparing the elliptic cross-section obtained by cutting the filament at an angle of 30° with respect to the drawing direction and performing the continuous hardness measurement between an end edge in a long axes direction of the elliptic cross-section and a center of the elliptic cross-section. From this graph, the thickness of the region having a Vickers hardness, which was lower than that of the filament at a depth of ¼ of the diameter r by Hv 50 or higher, was obtained. The depth interval in the hardness measurement was 1 μm.

The hardness of the surface layer was the average value of the Vickers hardness values measured at eight positions at a depth of 2 μm from the surface of the filament which were arranged at an angle interval of 45° with respect to the center of the filament.

The hardness of the center portion was the average value of the Vickers hardness values measured at the center of the filament and at eight positions of the filament at a depth of ¼ of the diameter r from the surface of the filament which were arranged at an angle interval of 45° with respect to the center of the filament.

The average lamellar spacing of the surface layer part (the lamellar spacing of the surface layer) was obtained through steps described below. First, a thin film sample (L cross-section thin film sample) having a thickness of 100 μm was created from the L cross-section. Then, samples of 50 μm×30 μm×1 μm were cut out from the surface layer part and the portion at a depth of ¼ of the diameter r of the L cross-section thin film sample with FIB (Focused Ion Beam) apparatus. The cut-out samples were electrolytically bonded on a sample holder for transmission electron microscope, and an electron microscope image including a region from the surface of the filament to a depth of 1 μm was taken. A surface layer average lamellar spacing measurement region shown in FIG. 8 was cut from the image. Next, as shown in FIG. 9, a pearlite having the smallest lamellar spacing was selected from the plurality of pearlites contained in the surface layer average lamellar spacing measurement region. A line segment having a length of 0.2 μm which was perpendicular to ferrite layers and cementite layers contained in the pearlite was drawn, the number of cementite layers intersecting the line segment was counted, and the length (0.2 μm) of the line segment was divided by the number of cementite layers. As a result, a lamellar spacing relating to the surface layer average lamellar spacing measurement region was obtained. Lamellar spacings relating to eight surface layer average lamellar spacing measurement regions were obtained, and the average thereof was obtained. As a result, the average lamellar spacing of pearlite in the region from the surface of the filament to a depth of 1 μm was obtained.

The average lamellar spacing of the center (the lamellar spacing of the center) was obtained through steps described below. Using the same method as the above-described method for measuring the average lamellar spacing of the surface layer part of the filament, a L cross-section of the filament is prepared, and an electron microscope image of a region including the center axis of the filament and an electron microscope image of a region including the portion at a depth of ¼ of the diameter r were taken. Next, lamellar spacings relating to twelve center average lamellar spacing measurement regions, which were squares having a size of 1 μm×1 μm, were obtained. In four regions of the twelve center average lamellar spacing measurement regions, one of line segments connecting the middle points of sides opposite to each other matched with the center axis of the filament. In eight regions of the twelve center average lamellar spacing measurement regions, one of line segments connecting the middle points of sides opposite to each other matched with the region from the surface of the filament to a depth of ¼ of the diameter r. Lamellar spacings relating to the twelve center average lamellar spacing measurement regions were obtained, and the average thereof was obtained. As a result, the average lamellar spacing of the center of the filament was obtained.

Whether or not delamination occurred was determined by performing a torsion test on the filament. In a case where the torsion test is performed on a filament where delamination occurs, a fracture surface formed by torsional fracture is not a shear fracture surface but a fracture surface following a longitudinal crack. Therefore, whether or not delamination occurs can be determined by inspecting the shape of the fracture of the torsion-fractured filament.

The tensile strength TS was obtained in a tensile test according to JIS Z 2241 "Method of Tensile Test for Metallic Materials".

The evaluation results are shown in Tables 1-3 and 2-3.

TABLE 1-1

| | No. | C | Si | Mn | Al | N | Ti | Cr | Mo |
|---|---|---|---|---|---|---|---|---|---|
| EXAMPLES | 1 | 0.72 | 0.16 | 0.99 | — | 0.0028 | — | — | — |
| | 2 | 0.72 | 0.31 | 0.12 | — | 0.0026 | 0.006 | — | — |
| | 3 | 0.72 | 0.17 | 0.79 | — | 0.0011 | 0.030 | 0.01 | — |
| | 4 | 0.72 | 0.16 | 0.99 | — | 0.0028 | 0.096 | 0.05 | 0.19 |
| | 5 | 0.72 | 0.31 | 0.12 | — | 0.0026 | 0.006 | — | — |
| | 6 | 0.72 | 0.30 | 0.79 | — | 0.0035 | 0.012 | 0.19 | 0.05 |
| | 7 | 0.71 | 0.32 | 0.99 | 0.006 | 0.0048 | — | 0.20 | — |
| | 8 | 0.72 | 0.59 | 0.11 | — | 0.0034 | 0.050 | 0.49 | — |
| | 9 | 0.72 | 0.58 | 0.79 | 0.009 | 0.0031 | — | 0.18 | — |
| | 10 | 0.72 | 0.59 | 0.98 | 0.001 | 0.0031 | — | — | 0.19 |
| | 11 | 0.81 | 0.17 | 0.99 | — | 0.0028 | 0.032 | — | — |
| | 12 | 0.80 | 0.31 | 0.12 | — | 0.0026 | 0.006 | 0.19 | — |
| | 13 | 0.79 | 0.58 | 0.79 | — | 0.0035 | 0.012 | 0.20 | 0.05 |
| | 14 | 0.89 | 0.59 | 0.12 | 0.001 | 0.0034 | 0.015 | 0.19 | — |
| | 15 | 0.88 | 0.34 | 0.98 | 0.003 | 0.0031 | 0.032 | 0.20 | — |
| | 16 | 0.89 | 0.17 | 0.78 | — | 0.0031 | — | — | — |
| | 17 | 0.98 | 0.30 | 0.98 | — | 0.0028 | 0.006 | 0.35 | 0.19 |
| | 18 | 0.97 | 0.59 | 0.12 | — | 0.0026 | 0.012 | — | — |
| | 19 | 0.99 | 0.17 | 0.99 | 0.003 | 0.0035 | — | 0.20 | — |
| | 20 | 1.09 | 0.17 | 0.98 | 0.001 | 0.0034 | 0.006 | 0.19 | 0.05 |
| | 21 | 1.08 | 0.31 | 0.12 | — | 0.0031 | 0.015 | 0.32 | — |
| | 22 | 1.08 | 0.59 | 0.79 | — | 0.0031 | 0.032 | — | — |
| | 23 | 1.18 | 0.16 | 0.12 | 0.003 | 0.0031 | — | 0.19 | — |
| | 24 | 1.19 | 0.30 | 0.79 | — | 0.0028 | — | 0.20 | — |
| | 25 | 1.19 | 0.59 | 0.98 | 0.002 | 0.0026 | — | — | 0.19 |

THE SYMBOL "—" REPRESENTS THAT AN ELEMENT CORRESPONDING TO THE SYMBOL IS NOT CONTAINED (OR IS CONTAINED AS AN IMPURITY).
THE REMAINDER OF THE CHEMICAL COMPOSITION OF EACH FILAMENT INCLUDES IRON AND IMPURITIES.

TABLE 1-2

| | No. | Cu | V | Co | W | Nb | B | Mg | Ca | REM | Zr |
|---|---|---|---|---|---|---|---|---|---|---|---|
| EXAMPLES | 1 | — | — | — | — | — | — | — | — | — | — |
| | 2 | 0.05 | — | — | 0.19 | — | — | — | — | — | — |
| | 3 | — | 0.05 | — | — | — | 0.0025 | — | — | — | — |
| | 4 | — | — | — | — | — | — | — | — | — | — |
| | 5 | 0.05 | — | — | 0.19 | — | — | — | — | — | — |
| | 6 | — | — | 0.13 | — | — | 0.0010 | — | — | — | — |
| | 7 | — | 0.12 | — | — | — | — | — | — | — | — |
| | 8 | 0.12 | — | — | — | — | — | — | — | 0.0029 | — |
| | 9 | — | — | 0.49 | — | 0.090 | 0.0010 | — | 0.0029 | — | — |
| | 10 | — | — | — | — | — | — | 0.0029 | — | — | — |
| | 11 | — | — | — | 0.070 | — | — | — | — | — | 0.0005 |
| | 12 | 0.19 | — | — | — | — | 0.0010 | — | — | — | — |
| | 13 | — | — | — | — | — | — | — | — | 0.0049 | — |
| | 14 | — | — | — | — | — | — | — | 0.0049 | — | — |
| | 15 | — | 0.49 | — | — | — | — | 0.0049 | — | — | — |
| | 16 | 0.05 | — | — | — | — | 0.0007 | — | — | — | 0.0009 |
| | 17 | — | — | — | — | — | — | — | — | — | — |
| | 18 | — | — | 0.12 | — | — | — | — | — | — | — |
| | 19 | — | 0.05 | — | — | — | — | — | — | — | — |
| | 20 | — | — | — | — | — | 0.0007 | — | — | — | — |
| | 21 | — | — | — | — | 0.020 | — | — | — | — | — |
| | 22 | 0.19 | — | — | 0.070 | — | — | — | — | — | — |
| | 23 | — | — | — | — | — | — | — | — | — | — |

TABLE 1-2-continued

| | CHEMICAL COMPOSITION (mass %) | | | | | | | | | |
|---|---|---|---|---|---|---|---|---|---|---|
| No. | Cu | V | Co | W | Nb | B | Mg | Ca | REM | Zr |
| 24 | — | 0.07 | — | — | — | — | — | — | — | — |
| 25 | — | — | — | — | — | — | — | — | — | — |

THE SYMBOL "—" REPRESENTS THAT AN ELEMENT CORRESPONDING TO THE SYMBOL IS NOT CONTAINED (OR IS CONTAINED AS AN IMPURITY).
THE REMAINDER OF THE CHEMICAL COMPOSITION OF EACH FILAMENT INCLUDES IRON AND IMPURITIES.

TABLE 1-3

| | | EVALUATION OF CHARACTERISTICS OF FILAMENT AFTER DRAWING | | | | | | | | |
|---|---|---|---|---|---|---|---|---|---|---|
| | No. | PEARLITE (area %) | DIAMETER r (mm) | THICKNESS OF SOFT PORTION (μm) | HARDNESS OF SURFACE LAYER (Hv) | HARDNESS OF CENTER PORTION (Hv) | LAMELLAR SPACING OF SURFACE LAYER (nm) | LAMELLAR SPACING OF CENTER PORTION (nm) | DIFFERENCE IN LAMELLAR SPACING (nm) | WHETHER OR NOT DELAMINATION OCCURRED | TENSILE STRENGTH TS (MPa) |
| EXAMPLES | 1 | 97 | 0.15 | 2 | 853 | 906 | 12.01 | 13.35 | 1.34 | NONE | 3723 |
| | 2 | 96 | 0.15 | 2 | 849 | 902 | 12.21 | 13.55 | 1.34 | NONE | 3703 |
| | 3 | 98 | 0.18 | 5 | 865 | 927 | 11.55 | 12.78 | 1.23 | NONE | 3835 |
| | 4 | 99 | 0.20 | 8 | 838 | 910 | 11.92 | 13.24 | 1.32 | NONE | 3754 |
| | 5 | 96 | 0.30 | 12 | 847 | 912 | 11.87 | 13.18 | 1.31 | NONE | 3778 |
| | 6 | 98 | 0.35 | 15 | 836 | 919 | 11.72 | 12.99 | 1.27 | NONE | 3821 |
| | 7 | 99 | 0.15 | 7 | 846 | 919 | 11.72 | 12.99 | 1.27 | NONE | 3732 |
| | 8 | 98 | 0.18 | 5 | 855 | 954 | 11.02 | 12.14 | 1.12 | NONE | 3777 |
| | 9 | 97 | 0.20 | 7 | 847 | 930 | 11.49 | 12.71 | 1.22 | NONE | 3731 |
| | 10 | 98 | 0.30 | 9 | 832 | 898 | 12.20 | 13.58 | 1.38 | NONE | 3745 |
| | 11 | 99 | 0.35 | 12 | 885 | 942 | 11.25 | 12.41 | 1.17 | NONE | 4021 |
| | 12 | 96 | 0.15 | 15 | 879 | 930 | 11.49 | 12.71 | 1.22 | NONE | 4011 |
| | 13 | 99 | 0.18 | 3 | 882 | 941 | 11.27 | 12.44 | 1.17 | NONE | 4012 |
| | 14 | 98 | 0.20 | 4 | 935 | 1004 | 10.20 | 11.14 | 0.93 | NONE | 4215 |
| | 15 | 99 | 0.30 | 5 | 925 | 1003 | 10.22 | 11.15 | 0.94 | NONE | 4222 |
| | 16 | 98 | 0.35 | 8 | 929 | 1017 | 10.02 | 10.91 | 0.89 | NONE | 4235 |
| | 17 | 99 | 0.15 | 5 | 954 | 1011 | 10.10 | 11.01 | 0.91 | NONE | 4343 |
| | 18 | 99 | 0.18 | 3 | 961 | 1019 | 9.99 | 10.88 | 0.89 | NONE | 4321 |
| | 19 | 98 | 0.20 | 4 | 956 | 1019 | 9.99 | 10.88 | 0.89 | NONE | 4305 |
| | 20 | 97 | 0.30 | 9 | 1032 | 1099 | 9.07 | 9.75 | 0.68 | NONE | 4532 |
| | 21 | 98 | 0.35 | 11 | 1023 | 1100 | 9.06 | 9.74 | 0.68 | NONE | 4555 |
| | 22 | 97 | 0.15 | 8 | 1015 | 1089 | 9.17 | 9.87 | 0.70 | NONE | 4567 |
| | 23 | 99 | 0.18 | 3 | 1068 | 1142 | 8.68 | 9.28 | 0.60 | NONE | 4765 |
| | 24 | 98 | 0.20 | 3 | 1054 | 1126 | 8.82 | 9.44 | 0.63 | NONE | 4798 |
| | 25 | 97 | 0.30 | 5 | 1052 | 1128 | 8.80 | 9.42 | 0.62 | NONE | 4799 |

TABLE 2-1

| | | CHEMICAL COMPOSITION (mass %) | | | | | | | |
|---|---|---|---|---|---|---|---|---|---|
| | No. | C | Si | Mn | Al | N | Ti | Cr | Mo |
| COMPARATIVE EXAMPLES | 26 | 0.68 | 0.16 | 0.12 | 0.005 | 0.0031 | — | 0.19 | — |
| | 27 | 1.23 | 0.30 | 0.79 | — | 0.0028 | — | 0.20 | — |
| | 28 | 0.80 | 0.12 | 0.12 | — | 0.0026 | 0.006 | 0.19 | — |
| | 29 | 0.72 | 0.65 | 0.13 | — | 0.0035 | 0.012 | 0.19 | 0.05 |
| | 30 | 0.81 | 0.17 | 0.09 | — | 0.0035 | — | 0.20 | — |
| | 31 | 0.89 | 0.39 | 1.05 | 0.006 | 0.0048 | 0.032 | 0.36 | 0.19 |
| | 32 | 0.87 | 0.23 | 0.78 | 0.008 | 0.0045 | 0.029 | 0.35 | 0.35 |
| | 33 | 0.82 | 0.29 | 0.12 | 0.012 | 0.0036 | 0.050 | 0.05 | — |
| | 34 | 0.82 | 0.29 | 0.12 | 0.003 | 0.0036 | 0.050 | 0.05 | — |
| | 35 | 0.81 | 0.24 | 0.35 | — | 0.0055 | — | 0.23 | — |
| | 36 | 0.79 | 0.25 | 0.34 | — | 0.0031 | — | 0.54 | 0.21 |
| | 37 | 0.81 | 0.23 | 0.46 | 0.003 | 0.0031 | — | 0.42 | 0.12 |
| | 38 | 0.70 | 0.22 | 0.45 | 0.003 | 0.0031 | — | 0.41 | 0.11 |
| | 39 | 0.70 | 0.22 | 0.45 | 0.003 | 0.0031 | — | 0.41 | 0.11 |
| | 40 | 0.70 | 0.22 | 0.45 | 0.003 | 0.0031 | — | 0.41 | 0.11 |
| | 41 | 0.70 | 0.22 | 0.45 | 0.003 | 0.0031 | — | 0.41 | 0.11 |
| | 42 | 0.70 | 0.22 | 0.45 | 0.003 | 0.0031 | — | 0.41 | 0.11 |
| | 43 | 0.70 | 0.22 | 0.45 | 0.003 | 0.0031 | — | 0.41 | 0.11 |
| | 44 | 0.70 | 0.22 | 0.45 | 0.003 | 0.0031 | — | 0.41 | 0.11 |

TABLE 2-1-continued

| | | CHEMICAL COMPOSITION (mass %) | | | | | | |
|---|---|---|---|---|---|---|---|---|
| No. | C | Si | Mn | Al | N | Ti | Cr | Mo |
| 45 | 0.70 | 0.22 | 0.45 | 0.003 | 0.0031 | — | 0.41 | 0.11 |
| 46 | 0.70 | 0.22 | 0.45 | 0.003 | 0.0031 | — | 0.41 | 0.11 |

THE SYMBOL "—" REPRESENTS THAT AN ELEMENT CORRESPONDING TO THE SYMBOL IS NOT CONTAINED (OR IS CONTAINED AS AN IMPURITY).
THE REMAINDER OF THE CHEMICAL COMPOSITION OF EACH FILAMENT INCLUDES IRON AND IMPURITIES.

TABLE 2-2

| | | | | CHEMICAL COMPOSITION (mass %) | | | | | | |
|---|---|---|---|---|---|---|---|---|---|---|
| | No. | Cu | V | Co | W | Nb | B | Mg | Ca | REM | Zr |
| COMPARATIVE EXAMPLES | 26 | — | — | — | — | — | — | — | — | — | — |
| | 27 | — | 0.07 | — | — | — | — | — | — | — | — |
| | 28 | 0.19 | — | — | — | — | 0.0010 | — | — | — | 0.0021 |
| | 29 | — | — | 0.13 | — | — | 0.0010 | — | 0.0027 | — | — |
| | 30 | — | 0.12 | — | — | — | — | — | 0.0031 | — | — |
| | 31 | — | — | — | — | — | — | 0.0038 | — | — | — |
| | 32 | — | — | — | — | — | — | — | 0.0036 | — | — |
| | 33 | 0.20 | 0.05 | — | — | 0.010 | — | — | — | — | — |
| | 34 | 0.20 | 0.05 | — | — | 0.010 | 0.0340 | — | — | — | — |
| | 35 | 0.03 | — | — | — | — | — | — | — | — | — |
| | 36 | — | — | — | — | — | — | — | — | — | — |
| | 37 | 0.06 | — | — | 0.055 | 0.017 | — | — | — | — | — |
| | 38 | 0.06 | — | — | 0.055 | 0.017 | — | — | — | — | — |
| | 39 | 0.06 | — | — | 0.055 | 0.017 | — | — | — | — | — |
| | 40 | 0.06 | — | — | 0.055 | 0.017 | — | — | — | — | — |
| | 41 | 0.06 | — | — | 0.055 | 0.017 | — | — | — | — | — |
| | 42 | 0.06 | — | — | 0.055 | 0.017 | — | — | — | — | — |
| | 43 | 0.06 | — | — | 0.055 | 0.017 | — | — | — | — | — |
| | 44 | 0.06 | — | — | 0.055 | 0.017 | — | — | — | — | — |
| | 45 | 0.06 | — | — | 0.055 | 0.017 | — | — | — | — | — |
| | 46 | 0.06 | — | — | 0.055 | 0.017 | — | — | — | — | — |

THE SYMBOL "—" REPRESENTS THAT AN ELEMENT CORRESPONDING TO THE SYMBOL IS NOT CONTAINED (OR IS CONTAINED AS AN IMPURITY).
THE REMAINDER OF THE CHEMICAL COMPOSITION OF EACH FILAMENT INCLUDES IRON AND IMPURITIES.

TABLE 2-3

| | | EVALUATION OF CHARACTERISTICS OF FILAMENT AFTER DRAWING | | | | | | | | | |
|---|---|---|---|---|---|---|---|---|---|---|---|
| | No. | PEARLITE (area %) | DIAMETER r (mm) | THICKNESS OF SOFT PORTION (μm) | HARDNESS OF SURFACE LAYER (Hv) | HARDNESS OF CENTER PORTION (Hv) | LAMELLAR SPACING OF SURFACE LAYER (nm) | LAMELLAR SPACING OF CENTER PORTION (nm) | DIFFERENCE IN LAMELLAR SPACING (nm) | WHETHER OR NOT DELAMINATION OCCURRED | TENSILE STRENGTH TS (MPa) |
| COMPARATIVE EXAMPLES | 26 | 94 | 0.30 | 3 | 821 | 893 | 12.32 | 13.73 | 1.40 | NONE | 3154 |
| | 27 | 98 | 0.18 | 5 | 1069 | 1132 | 8.77 | 9.38 | 0.61 | OCCURRED | 4790 |
| | 28 | 97 | 0.20 | 4 | 823 | 892 | 12.35 | 13.76 | 1.41 | NONE | 3164 |
| | 29 | 96 | 0.20 | 3 | 903 | 956 | 10.99 | 12.09 | 1.11 | OCCURRED | 4001 |
| | 30 | 96 | 0.23 | 6 | 883 | 944 | 11.21 | 12.37 | 1.16 | OCCURRED | 4012 |
| | 31 | 97 | 0.25 | 4 | 932 | 986 | 10.48 | 11.47 | 0.99 | OCCURRED | 4032 |
| | 32 | 96 | 0.25 | 5 | 912 | 985 | 10.98 | 11.46 | 0.48 | OCCURRED | 4012 |
| | 33 | 96 | 0.21 | 6 | 879 | 942 | 11.25 | 12.41 | 1.17 | OCCURRED | 4013 |
| | 34 | 96 | 0.20 | 6 | 867 | 938 | 11.40 | 12.56 | 1.16 | OCCURRED | 4001 |
| | 35 | 98 | 0.18 | 4 | 886 | 942 | 11.25 | 12.41 | 1.17 | OCCURRED | 3899 |
| | 36 | 92 | 0.18 | 4 | 882 | 932 | 11.35 | 12.60 | 1.25 | OCCURRED | 3876 |
| | 37 | 95 | 0.18 | 0 | 876 | 902 | 12.10 | 13.46 | 1.36 | OCCURRED | 3957 |
| | 38 | 95 | 0.18 | 6 | 813 | 865 | 10.73 | 12.98 | 2.25 | OCCURRED | 3245 |
| | 39 | 93 | 0.18 | 4 | 809 | 865 | 10.70 | 12.31 | 1.61 | OCCURRED | 3345 |
| | 40 | 92 | 0.18 | 5 | 813 | 878 | 10.40 | 12.14 | 1.74 | OCCURRED | 3435 |
| | 41 | 89 | 0.18 | 5 | 775 | 831 | 12.34 | 13.21 | 0.87 | OCCURRED | 3009 |
| | 42 | 95 | 0.18 | 5 | 804 | 854 | 10.37 | 12.31 | 1.94 | NONE | 3001 |
| | 43 | 95 | 0.18 | 0 | 813 | 834 | 10.33 | 11.57 | 1.24 | OCCURRED | 3435 |
| | 44 | 95 | 0.18 | 0 | 839 | 851 | 11.10 | 12.87 | 1.77 | OCCURRED | 3520 |
| | 45 | 90 | 0.18 | 0 | 813 | 822 | 10.34 | 11.89 | 1.55 | OCCURRED | 3002 |
| | 46 | 95 | 0.18 | 19 | 775 | 834 | 10.37 | 12.21 | 1.84 | NONE | 3004 |

In Comparative Example 26 in which the C content was insufficient, the fraction of pearlite was less than 95 area %. As a result, the tensile strength of Comparative Example 26 was lower than 3200 MPa.

In Comparative Example 28 in which the Si content was insufficient, the tensile strength was lower than 3200 MPa.

In Comparative Example 27 in which the C content was excessive and Comparative Example 29 in which the Si content was excessive, delamination occurred due to deterioration in workability.

In Comparative Example 30 in which the Mn content was insufficient, the deoxidation and the fixation of S were not sufficiently performed, and thus delamination occurred.

In Comparative Example 31 in which the Mn content was excessive, delamination occurred due to deterioration in workability.

In Comparative Example 32 in which the Mo content was excessive, drawability deteriorated due to the precipitation of a Mo carbide, and thus delamination occurred.

In Comparative Example 33 in which the Al content was excessive, delamination occurred due to the production of an alumina-based inclusion which caused deterioration in the ductility and drawability of the filament.

In Comparative Example 34 in which the B content was excessive, delamination occurred due to the production of coarse $Fe_{23}(CB)_6$ which caused deterioration in the ductility of the filament.

In Comparative Example 35 in which the N content was excessive, delamination occurred due to deterioration in ductility.

In Comparative Example 36 in which the Cr content and the Mo content were excessive, a large amount of upper bainite or martensite was produced, the fraction of pearlite decreased, and the drawability deteriorated. Therefore, delamination occurred.

In Comparative Example 37 in which surface layer heating was not performed, the soft portion was not formed. Therefore, workability deteriorated, and thus delamination occurred.

In Comparative Example 38 in which the heating temperature before patenting was excessive, the difference in average lamellar spacing was excessive, and thus delamination occurred.

In Comparative Example 39 in which the heating temperature before patenting was insufficient, the amount of pearlite decreased, and the drawability deteriorated. Therefore, delamination occurred.

In the filament of Comparative Example 40 in which the dipping time in the lead bath in the patenting was insufficient, the fraction of pearlite decreased, and delamination occurred.

In the filament of Comparative Example 41 in which the dipping time in the lead bath in the patenting was excessive, cementite in pearlite was fragmented, and the amount of pearlite was insufficient. As a result, the drawability and the tensile strength decreased.

In the filament of Comparative Example 42 in which the cooling rate after the dipping in the lead bath in the patenting was insufficient, the tensile strength decreased.

In the filament of Comparative Example 43 in which the frequency of high-frequency heating which was performed in the surface layer heating was insufficient, the inside of the filament was also heated, and the thickness of the soft portion was insufficient. Therefore, delamination occurred.

In the filament of Comparative Example 44 in which the surface layer heating temperature in the surface layer heating was insufficient, the hardness of the surface layer did not decrease, and the thickness of the soft portion was insufficient. Therefore, delamination occurred.

In the filament of Comparative Example 45 in which the surface layer heating temperature in the surface layer heating was excessive, the inside of the filament was also heated. As a result, cementite in pearlite was fragmented, and the amount of pearlite was insufficient. Therefore, the tensile strength decreased.

In the filament of Comparative Example 46 in which the period of time required to control the surface layer temperature to be 500° C. or lower in the cooling after the surface layer heating was excessive, the depth of the soft portion was excessive. Therefore, the tensile strength was insufficient.

On the other hand, in Examples 1 to 25 of the present invention, the tensile strength was 3700 MPa or higher, and delamination did not occur.

It was verified from the above results that, according to the present invention, it is possible to provide a filament with which a high-strength steel cord having high strength and good workability can be stably manufactured.

INDUSTRIAL APPLICABILITY

According to the present invention, a filament having high strength and good workability can be provided. This filament is suitable for manufacturing a high-strength steel cord with high yield. The high-strength steel cord is extremely advantageous for reducing the weight of an automobile tire to reduce the fuel consumption of a vehicle. Therefore, the filament according to the present invention has industrial applicability.

BRIEF DESCRIPTION OF THE REFERENCE SYMBOLS

10: FILAMENT
11: SOFT PORTION
12: CENTER PORTION
13: INDENTATION
14: SURFACE LAYER AVERAGE LAMELLAR SPACING MEASUREMENT REGION
15: CENTER AVERAGE LAMELLAR SPACING MEASUREMENT REGION
16: ELLIPTIC CROSS-SECTION
17: END EDGE IN LONG AXES DIRECTION OF ELLIPTIC CROSS-SECTION
18: CENTER OF ELLIPTIC CROSS-SECTION
19: PORTION OF FILAMENT AT DEPTH OF ¼ OF DIAMETER r
20: PEARLITE
21: FERRITE LAYER
22: CEMENTITE LAYER
23: LINE SEGMENT

The invention claimed is:

1. A filament comprising, as a chemical composition, by mass %,
C: 0.70% to 1.20%,
Si: 0.15% to 0.60%,
Mn: 0.10% to 1.00%,
N: 0.0010% to 0.0050%,
Al: 0% to 0.010%,
Ti: 0% to 0.10%,
Cr: 0% to 0.50%,
Co: 0% to 0.50%,
V: 0% to 0.50%,
Cu: 0% to 0.20%, Nb: 0% to 0.100%,
Mo: 0% to 0.20%,
W: 0% to 0.200%,
B: 0% to 0.0030%,
REM: 0% to 0.0050%,
Ca: 0% to 0.0050%,
Mg: 0% to 0.0050%,
Zr: 0% to 0.0100%, and
a remainder including Fe and impurities,
wherein a diameter r of the filament is 0.15 mm to 0.35 mm,
a soft portion is formed along an outer circumference of the filament,
a Vickers hardness of the soft portion is lower than that of the filament at a depth of ¼ of the diameter r by a Hv 50 or higher,
a thickness of the soft portion is 1 μm to 0.1×r mm,
a metallographic structure of the filament other than the soft portion contains 95% to 100% of pearlite by area %,
an average lamellar spacing of the pearlite in a region from a surface of the filament to a depth of 1 μm is less than that of the pearlite at the center of the filament,
a difference between the average lamellar spacing of the pearlite in the region from the surface of the filament to the depth of 1 μm and the average lamellar spacing of the pearlite at the center of the filament is 2.0 nm or less, and
a tensile strength is 3200 MPa or higher.

2. The filament according to claim 1,
wherein the thickness of the soft portion is 2 μm to 0.08×r mm.

3. The filament according to claim 1,
wherein the difference between the average lamellar spacing in the region from the surface of the filament to the depth of 1 μm and the average lamellar spacing of the center of the filament is 1.7 nm or less.

4. The filament according to claim 1, further comprising, as the chemical composition, by mass %, one element or two or more elements selected from the group consisting of:
Ti: 0.005% to 0.10%,
Cr: more than 0% to 0.50%,
Co: more than 0% to 0.50%,
V: more than 0% to 0.50%,
Cu: more than 0% to 0.20%,
Nb: more than 0% to 0.100%,
Mo: more than 0% to 0.20%,
W: more than 0% to 0.20%,
B: more than 0% to 0.0030%,
REM: more than 0% to 0.0050%,
Ca: more than 0.0005% to 0.0050%,
Mg: more than 0.0005% to 0.0050%, and
Zr: more than 0.0005% to 0.0100%.

5. The filament according to claim 2,
wherein the difference between the average lamellar spacing in the region from the surface of the filament to the depth of 1 μm and the average lamellar spacing of the center of the filament is 1.7 nm or less.

6. The filament according to claim 2, further comprising, as the chemical composition, by mass %, one element or two or more elements selected from the group consisting of:
Ti: 0.005% to 0.10%,
Cr: more than 0% to 0.50%,
Co: more than 0% to 0.50%,
V: more than 0% to 0.50%,
Cu: more than 0% to 0.20%,
Nb: more than 0% to 0.100%,
Mo: more than 0% to 0.20%,
W: more than 0% to 0.20%,
B: more than 0% to 0.0030%,
REM: more than 0% to 0.0050%,
Ca: more than 0.0005% to 0.0050%,
Mg: more than 0.0005% to 0.0050%, and
Zr: more than 0.0005% to 0.0100%.

7. The filament according to claim 3, further comprising, as the chemical composition, by mass %, one element or two or more elements selected from the group consisting of:
Ti: 0.005% to 0.10%,
Cr: more than 0% to 0.50%,
Co: more than 0% to 0.50%,
V: more than 0% to 0.50%,
Cu: more than 0% to 0.20%,
Nb: more than 0% to 0.100%,
Mo: more than 0% to 0.20%,
W: more than 0% to 0.20%,
B: more than 0% to 0.0030%,
REM: more than 0% to 0.0050%,
Ca: more than 0.0005% to 0.0050%,
Mg: more than 0.0005% to 0.0050%, and
Zr: more than 0.0005% to 0.0100%.

8. The filament according to claim 5, further comprising, as the chemical composition, by mass %, one element or two or more elements selected from the group consisting of:
Ti: 0.005% to 0.10%,
Cr: more than 0% to 0.50%,
Co: more than 0% to 0.50%,
V: more than 0% to 0.50%,
Cu: more than 0% to 0.20%,
Nb: more than 0% to 0.100%,
Mo: more than 0% to 0.20%,
W: more than 0% to 0.20%,
B: more than 0% to 0.0030%,
REM: more than 0% to 0.0050%,
Ca: more than 0.0005% to 0.0050%,
Mg: more than 0.0005% to 0.0050%, and
Zr: more than 0.0005% to 0.0100%.

* * * * *